United States Patent [19]
Glaze et al.

[11] Patent Number: 5,593,888
[45] Date of Patent: Jan. 14, 1997

[54] METHOD FOR ACCELERATED BIOREMEDIATION AND METHOD OF USING AN APPARATUS THEREFOR

[75] Inventors: Bradley S. Glaze, Lyons; Kenneth R. Warner, Gladstone, both of Oreg.; Terry D. Horn, White Salmon; Ronald D. Horn, Vancouver, both of Wash.

[73] Assignee: H&H Eco Systems, Inc., North Bonneville, Wash.

[21] Appl. No.: 223,523

[22] Filed: Apr. 5, 1994

Related U.S. Application Data

[60] Continuation-in-part of Ser. No. 43,666, Apr. 6, 1993, abandoned, which is a division of Ser. No. 918,528, Jul. 21, 1992, abandoned.

[51] Int. Cl.$^6$ .................. A62D 3/00; B01F 7/00; B01F 15/00; B01F 15/02; B02C 1/00; B02C 13/00; B02C 13/28; B09B 3/00; C12S 1/00; C12S 13/00

[52] U.S. Cl. .................. 435/262.5; 435/262; 241/1; 241/5; 241/15; 241/26; 241/83; 241/195; 241/277; 241/DIG. 38; 366/131; 366/331; 366/345; 366/325.1; 366/327.1; 366/189; 588/203

[58] Field of Search .................. 435/262, 262.5, 435/316; 56/14.7, 400; 241/1, 5, 15, 26, 83, 277, 195, DIG. 38; 366/101.7, 189.1, 325, 327, 329, 331, 131, 345; 588/203; 405/128

[56] References Cited

U.S. PATENT DOCUMENTS 4,397,674 8/1983 Laughbaum .................. 435/287

*Primary Examiner*—Esther Kepplinger
*Assistant Examiner*—Curtis E. Sherrer
*Attorney, Agent, or Firm*—Marger Johnson McCollom & Stolowitz, P.C.

[57] ABSTRACT

This invention relates to a method of using an apparatus is provided for the accelerated bioremediation of treated contaminated material. The material is treated with chemical and/or biological amendments for facilitating accelerated bioremediation thereof. The apparatus comprises a system for for generating a treated contaminated material entraining air stream at a predetermined velocity for entraining the treated contaminate material therein for microenfractionating the treated contaminated material. In this way, accelerated bioremediation is facilitated. In another form of the invention, a method of accelerated bioremediation of treated contaminated material is provided. This method comprises the steps of (a) treating the treated contaminated material with chemical and/or biological amendments for facilitating accelerated bioremediation thereof, (b) providing an entraining air stream having a sufficient velocity for entraining the treated contaminated material therein, (c) entraining the treated contaminated material in the air stream, (d) microenfractionating the treated contaminated material, and (e) discharging the microenfractionated treated contaminated material from the air stream. In this way, the treated contaminated material can be acceleratedly bioremediated.

44 Claims, 13 Drawing Sheets

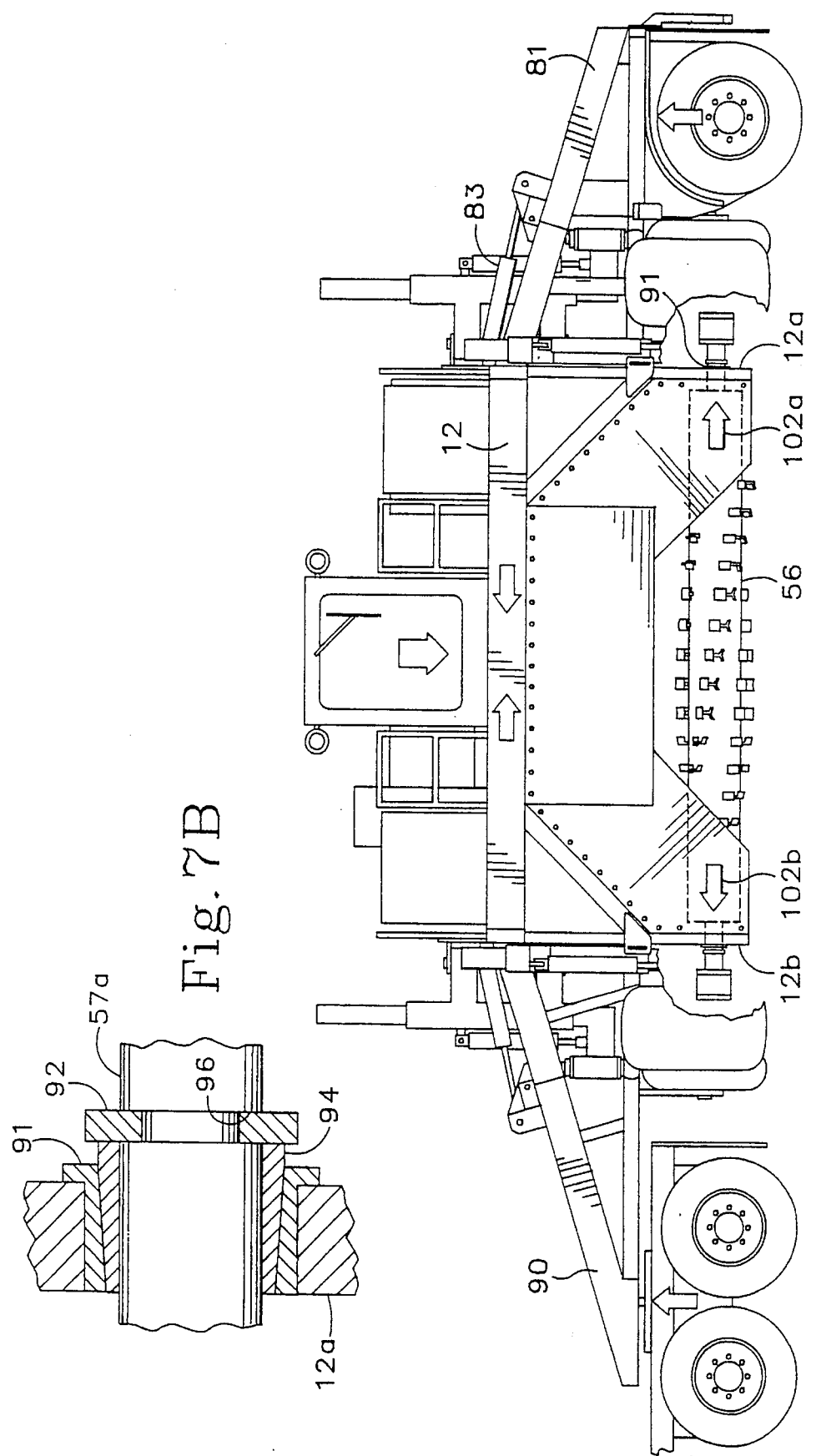

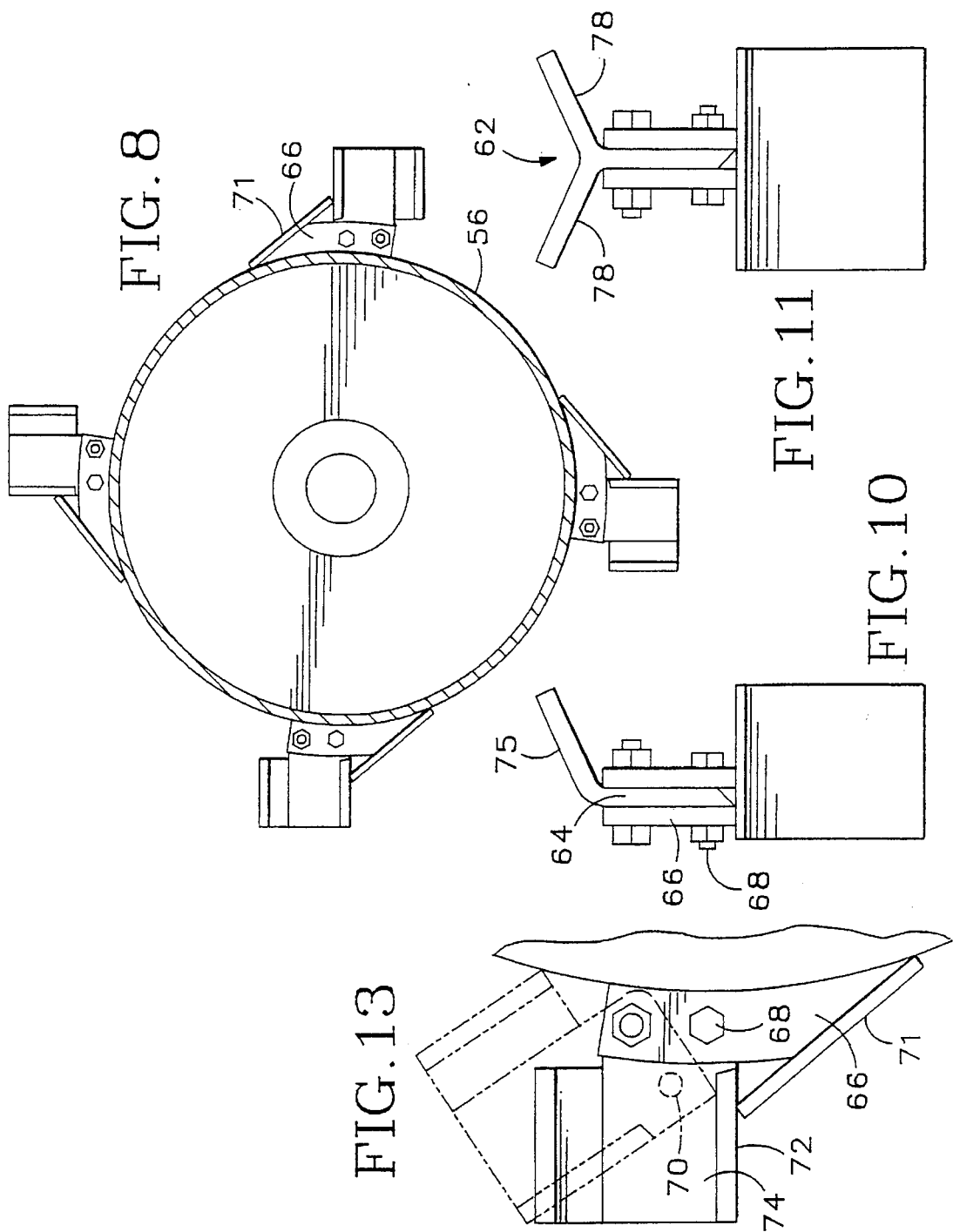

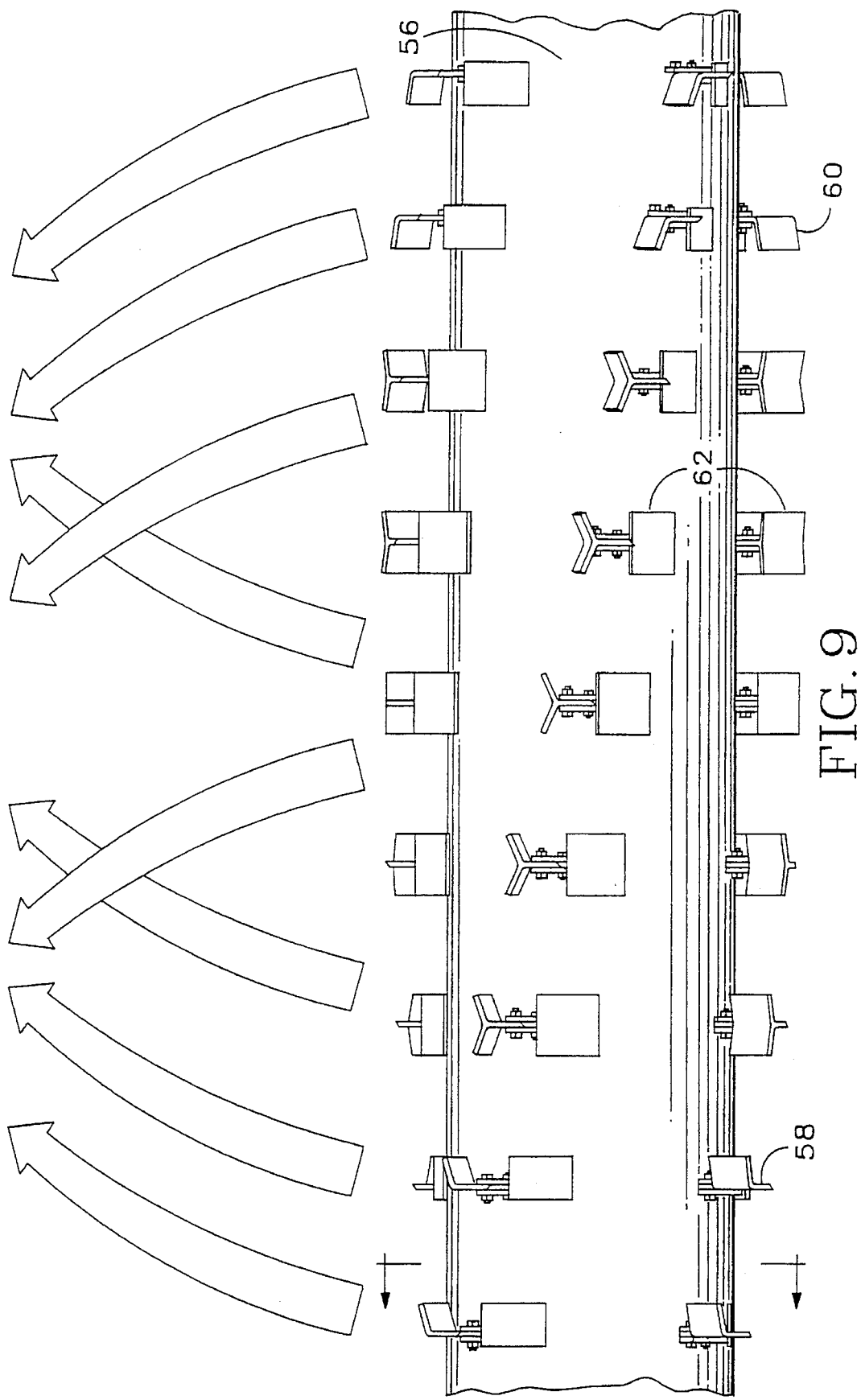

METHOD FOR ACCELERATED BIOREMEDIATION AND METHOD OF USING AN APPARATUS THEREFOR

RELATED APPLICATION

This is a continuation-in-part application of U.S. Ser. No. 08/043,666, filed Apr. 6, 1993, now abandoned which is a divisional application of U.S. Ser. No. 07/918,528 now abandoned, filed Jul. 21, 1992.

BACKGROUND OF THE INVENTION

The present invention relates to a method for the accelerated bioremediation of contaminated material and to a method of using an apparatus therefor, and more particularly to the accelerated bioremediation of contaminated material treated with chemical and/or biological amendments.

Bioremediation in general involves the degradation of contaminated material, typically by the action of contaminate degrading aerobic bacteria. When practiced on a small scale, it is relatively easy to maintain the aerobic conditions required by the bacteria; it is much more difficult to do on a larger scale. Failure to maintain aerobic conditions throughout the contaminate material results in anaerobic decay of the material, which is much less efficient and much more time consuming than aerobic decomposition. This provides strong incentive to maintain aerobic reaction conditions at all times.

The biological degradation of hydrocarbons can be conducted employing specialized bacteria that utilizes hydrocarbons as their sole metabolic carbon source or as a co-metabolite. The bacteria produce enzymes which catalytically crack the covalent carbon-hydrogen bonds of hydrocarbons so that the smaller resulting molecules may pass through the cell wall of the bacterial organism for nutrient. In some instances, the bacteria may produce enzymes which crack a carbon bond on an alternate carbon source such as a carbohydrate. This same enzyme may also crack the hydrocarbon. This is called co-metabolism.

In addition to a carbon source, most living organisms require a balance of other nutrients such as nitrogen, phosphorus, various minerals in micro quantities, etc. to efficiently metabolize and reproduce. Any specific nutrient that is deficient in a given biological system will limit the efficiency of that system. This is akin to the "basic 4 food groups" idea of human nutrition which includes protein as a nitrogen source, carbohydrate as a carbon source, dairy as a fat or fatty acid source plus phosphorus and a large number of vegetables as a vitamin and mineral source. Although bacterial requirements may be different from humans, a balanced nutritional system is required for optimal bacterial activity.

There are thousands of identified sites in the United States containing hazardous wastes. For most of these sites, the recognized methods for closure are:

1. Cap and store-in-place
2. Removal to an approved hazardous waste landfill.
3. Solidify in place with fixation chemicals In addition to the methods generally known, many industrial plants have used biological solutions to effect closures. Quite a few biological cleanups took place prior to the effect of the RCRA and TSCA legislation. Now under the formal guidelines of current hazardous waste regulation, use of biological treatment can offer an economical alternative to the methods listed above.

Biological treatment of hazardous waste chemicals can take the following forms:

1. Treatment of industrial wastewater through biological oxidation under an NPDES permit.
2. Treatment of on site chemicals through controlled release to an NPDES-permitted system (many states allow this through a temporary permit amendment).
3. Treatment of leachates collected under hazardous waste sites. In some cases a cone of depression can be created to leach organics out at a rapid rate.
4. Land farm of sludges and solid-containing organics.

Land farming is of principle interest due to the large numbers of area sites with contaminated sludges and soils.

A key issue in a hazardous waste site closure is permitting land farms. Often obtaining such a permit is not feasible under existing regulations. In most cases, those regulations were intended to address new land farms. Land farming is a biochemical process which operates at low biological reaction rates. The variables controlling total cleanup time in a land farm are initial substrate concentrations, desired treatment levels, area available for land farm and turnaround time to dispose of decontaminated sludge or soil. Many hazardous waste sites could be successfully land farmed in 6–12 months, after pilot work is complete.

The actual protocol for land farming a particular site should be established for each site by a combination of pilot testing and practice. A typical protocol for land farming a hazardous waste site would be as follows:

1. CHARACTERIZATION OF THE SITE

This includes additional soil borings, groundwater monitoring and chemical analyses to determine the site contamination characteristics.

2. CHARACTERIZATION OF THE ORGANICS AS TO BIODEGRADABILITY

This is usually researched into the treatability of chemicals found in the site.

3. CHARACTERIZATION OF THE SOIL

The soil must be analyzed for pH, macronutrients (N,P,K), micronutrients (usually trace metals), permeability, moisture content and other conditions which will determine its suitability for land farming.

4. CRITERIA FOR SUCCESSFUL LAND TREATMENT

A chemical protocol is established to allow monitoring of the land farm. This is a two-tier protocol consisting of:
   A. Control analyses to allow quick determination of treatment progress during the land farming.
   B. Objective toxicity testing to be used when control analyses indicate that the treatment is complete. This includes all testing for leachate priority pollutants.

5. BENCH SCALE LAND FARM TREATMENT

Using the site characteristics, the land farm is simulated and efficiency of the treatment is proven. Samples of decontaminated soil and sludge may be presented for reference analyses.

6. DESIGN OF LAND FARM TREATMENT

The consultant and land farm specialists designate the portion of the closure site to be used for the land farm and design excavation schedules, aeration and mixing techniques, irrigation method, run-off collection, and decontaminated soil removal and disposal method.

7. IMPLEMENTATION OF LAND FARM TREATMENT

Beginning with a surface treatment of the site to be used, the land farm is begun. After control testing shows a desired level of treatment, toxicology tests are made. The soil may then be decontaminated and removed, if desired. Land farming is then usually continued in 12" lifts.

8. CLOSURE

Decontaminated sludges and soils are removed to a non-hazardous waste landfill or landfilled on-site.

The above steps are difficult and timely in their performance and extremely costly to the end user.

There are known machines for physically mixing materials in the field such as compost to maintain aerobic conditions. An example is U.S. Pat. No. 4,360,065 to Jenison et al. The Jenison cultivator comprises a horizontal rotating drum having a plurality of cultivator blades in two helical rows. As the drum is rotated, the blades travel edgewise through a pile of composting material to move the material sideways and pile it in a generally triangular pile. The '065 patent further describes other composting machines such as the Scarab, sold by Scarab Manufacturing and Leasing, Inc. of White Deer, Tex. U.S. Pat. No. 3,369,797 to Cobey describes a compost turner and windrow forming machine having a transversely mounted rotating drum for the turning of compost piles and the redepositing of the turned up material in a windrow. Yet another composting apparatus is described in U.S. Pat. No. 4,019,723 to Urbanczyk. The '723 patent describes a mobile composter for manure which moves a rotating drum over masses of inoculated manure to flail it, mix it, cool it and aerate it, while moistening the particles as the same time. After being conditioned and moisturized, the material is formed into a pile by a rear outlet opening. As with the Cobey composter, the flails mounted on the drum of the Urbanczyk machine travel edgewise through the composting material for flailing and mixing. U.S. Pat. No. 4,478,520 also to Cobey describes a compost turning machine which straddles a compost windrow while carrying a rotating drum for turning the composting material. The '520 composter additionally has an adjuster auger system outboard of the rotating drum to collect additional material and deposit it in the path of the rotating drum. This is the Cobey machine referred to earlier.

A need therefore exists for a method of bioremediation which will overcome the problems associated with the above described prior art methods by substantially eliminating the contaminants from contaminated material in an effective, efficient and accelerated manner.

SUMMARY OF THE INVENTION

Applicants have met the above-described existing needs and have overcome the above-described prior art problems through the invention set forth herein.

In one form of the invention, a method of using an apparatus is provided for the accelerated bioremediation of treated contaminated material. The material is treated with chemical and/or biological amendments for facilitating accelerated bioremediation thereof. The apparatus comprises means for generating a treated contaminated material entraining air stream at a predetermined velocity for entraining the treated contaminate material therein for microenfractionating the treated contaminated material. In this way, accelerated bioremediation is facilitated.

Generally, the means for generating a treated contaminated material entraining air stream at a predetermined velocity comprises an elongate drum having a longitudinal axis, first and second end portions, and a center portion. The drum is rotatable about its longitudinal axis at a predetermined rotational speed, and means extending outwardly from the drum are provided for generating the treated contaminated material entraining air stream. Preferably, the treated contaminated material entraining air stream comprises a plurality of air currents, and the air current generating means comprises a plurality of paddles extending outwardly from the cylindrical outer surface of the drum. Typically, each paddle comprises a base portion connected to the drum, and a blade portion. Each blade portion has a major surface oriented for generating at least one the air current having a sufficient velocity for entraining and transporting treated contaminated material upwardly of the rotating drum when the drum is rotated at the predetermined rotational velocity.

The treated contaminated material entraining air stream preferably comprises a plurality of intersecting air currents. Each of the intersecting air currents has a sufficient velocity for entraining and transporting a portion of the treated contaminated material upwardly of the air stream generating means. More specifically, the means for generating a plurality of intersecting air currents comprises a plurality of end paddles extending radially outwardly from the first and second end portions of the drum. Each end paddle can comprise a base portion connected to the drum and a blade portion. In this instance, the blade portion has a major surface oriented relative to the drum for generating an air current directed upwardly of the drum and transversely toward the center portion of the drum when the drum is rotated at the predetermined rotational speed. It also has a plurality of center paddles extending radially outwardly from the center portion of the cylindrical outer surface. Each center paddle comprises a base portion connected to the drum, and a blade portion having first and second major surfaces. The first and second major surfaces are oriented relative to the drum for generating an air current directed upwardly and rearwardly of, and transversely toward the first and second end portions of the drum respectively when the drum is rotated at the predetermined rotational speed. In use, the air currents generated by the end and center paddles intersect and combine to form the treated contaminated material entraining air stream for microenfractionating the treated contaminated material.

In a preferred embodiment, the treated contaminated material entraining air stream comprises a vortex-type air stream which transports the entrained treated contaminated material in a generally circular path. In this case, the end and center paddles can extend radially outwardly from the drum so that they are arranged in a plurality of helical longitudinal rows. Also, the drum can further comprises first and second transition portions disposed between the center portion and the first and second end portions respectively. The first and second transition portions of the drums having a plurality of end paddles and a plurality of center paddles extending radially outwardly therefrom.

In another form of the invention, a method of accelerated bioremediation of treated contaminated material is provided. This method comprises the steps of (a) treating the treated contaminated material with chemical and/or biological amendments for facilitating accelerated bioremediation thereof, (b) providing an entraining air stream having a sufficient velocity for entraining the treated contaminated material therein, (c) entraining the treated contaminated material in the air stream, (d) microenfractionating the treated contaminated material, and (e) discharging the microenfractionated treated contaminated material from the air stream. In this way, the treated contaminated material acceleratedly bioremediated. The microenfractionating step preferably comprises homogenization and aeration of the treated contaminated material. The entraining air stream preferably comprises providing an entraining air stream including a plurality of upwardly and transversely flowing, intersecting air currents, and more preferably comprises a vortex-like entraining air stream. Typically, the step of providing an entraining air stream includes the step of rotating a drum assembly at a rotational speed sufficient for generating the entraining air stream. The drum assembly can include means for generating this plurality of intersecting air currents when the drum assembly is rotated.

In one preferred method, the treated contaminated material is contaminated with a hydrocarbon material, and the accelerated bioremediation of the treated contaminated material comprises accelerated chain scission of the hydrocarbon material. In another case, when the treated contaminated material is contaminated with hydrocarbon material, the accelerated bioremediation produces $CO_2$ and water ($H_2O$) from the treated contaminated soil and purges $CO_2$ therefrom. A further instance is where the treated contaminated material is contaminated with hydrocarbon material, and the accelerated bioremediation comprises reduction of the total hydrocarbon material in the treated contaminated material.

In general, at least about 70%, preferably at least about 80%, more preferably at least about 90%, and most preferably at least about 95% of the accelerated bioremediation of the treated contaminated material is completed within 150 days, preferably within 120 days, more preferably within 90 days, and most preferably within 60 days. Moreover, the volume of treated contaminated material which is acceleratedly bioremediately treated by the method of the present invention is generally at least about 1500 cubic yards, preferably at least about 2000 cubic yards more preferably at least about 2500 cubic yards, most preferably at least about 3000 cubic yards, per day per apparatus.

The method of this invention can further include the step of adding wood particles to the treated contaminated material prior to the microenfractionating step. This assists in microenfractionation and allows the user to visually determine the extent to which the treated contaminated material has been redistributed over a given soil matrix area. The amount of wood particles which can be added to the treated contaminated material prior to the microenfractionating step is preferably up to about 20% by volume, based on the total volume of the treated contaminated material.

The method of the subject invention produces high surface area treated contaminated microenfractionated material. The surface area of the treated contaminated non-microenfractionated material can be increased, after the microenfractionating step, as compared to the surface area of the treated contaminated non-microenfractionated material, by a factor of at least about $1 \times 10^6$, preferably at least about $2 \times 10^6$, more preferably at least about $3.5 \times 10^6$, and most preferably at least about $5 \times 10^6$. More specifically, the subject method can further include the step of discharging the microenfractionated treated contaminated material from the air stream and redistributing it throughout a soil matrix. In this manner, the surface area of the microenfractionated treated contaminated material is substantially increased. This is especially important when dealing with clay type soils.

Most prior art remediation processes cannot be conducted at ambient temperatures below 10 degrees C. However, when the method of the subject invention is employed, the aforementioned high degree of accelerated bioremediation can be maintained at an average ambient temperature which is not more than about 10 degrees C., preferably not more than about 7 degrees C., more preferably not more than about 3 degrees C., and most preferably not more than about 1 degree C.

One reason why the accelerated bioremediation of this invention can be conducted at the low ambient temperature conditions described in the preceding paragraph herein, is that the subject reaction is generates a more substantial amount of exothermic heat than known prior art remediation processes. Thus, the accelerated bioremediation is preferably conducted at an exothermic temperature measured within the contaminated material of at least about 5 degrees, and more preferably at least about 10 degrees, higher than an average ambient air temperatures of from about zero up to about 10 degrees C.

As for the treatment of the contaminated material with the chemical and/or biological amendments, it is preferred that they are dispersed throughout the redistributed microenfractionated treated contaminated material thereby facilitating accelerated bioremediation. The chemical and/or biological amendments are preferably substantially organic in nature. In conventional treatment, inorganic materials are added to the contaminated material and react to form, over time, the organic materials required in the bioremediation process. This time lag from the introduction of inorganic materials onto the treatment area and the formation of organic material and the initiation of a significant remediation thereof is defined as an induction time. In the method of the present invention, the induction time for converting inorganic amendments into organic amendments for conducting the accelerated bioremediation is substantially zero.

Other preferred embodiments of the subject method include (a) locating an impervious undercover below the treated contaminated material prior to the microenfractionating step thereby preventing the chemical and/or biological amendments from leaching into soil underlying the treated contaminated material, and (b) a cover over the microenfractionated treated contaminated material, the cover allowing substantial solar radiation to pass therethrough and into the microenfractionated treated contaminated material, thereby facilitating the accelerated bioremediation and preventing moisture from soaking the microenfractionated treated contaminated material and to prevent moisture evaporation from the microenfractionated treated contaminated material.

BRIEF DESCRIPTION OF THE DRAWINGS

FIG. 8 is a right side cross-sectional view of the drum and paddle assembly according to the present invention.

FIG. 10 is a top view of a right side paddle.

FIG. 11 is a top view of a center paddle.

FIG. 12 is a top view of a left side paddle.

FIG. 13 is a side view of a right side paddle showing the shear pin feature, and showing the released paddle in phantom.

DETAILED DESCRIPTION OF THE PREFERRED EMBODIMENT

The method of the present invention differs from the prior art in that it approaches bacterial activity from a total nutritional point of view. The subject method employs chemical and/or biological amendments that are organic in nature, and are nutritionally balanced to provide all of the nutrients required to efficiently biodegrade whatever the material contaminant is present. Preferably, the material contaminant is an organic molecular contaminant. In addition, these chemical and/or biological amendments are preferably partially water soluble to prevent them from migrating away from the contaminated areas. Migration of prior art chemicals such as ammonium nitrate, for example, will move five inches in sandy soil for every inch of water applied. Also, under certain pH conditions like alkaline, phosphates move very little. Based on these two characteristics, the nutrients required by bacteria will not be effectively and efficiently available or in balance in an inorganic nutrient system.

One area of bioremediation often overlooked is adequate balance of the contaminated soil with nutrients and bacteria. In order for bioremediation to function, a total and complete balanced nutrition is required. Correct selection of bacteria degraders, neutral balance of pH in both soil and all liquids being added to the soil, and adequate water, oxygen and temperature are also essential. If any of these factors is not within certain parameters, the bioremediation will either be slowed down or fail.

A proprietary process of activating commercial bacteria has been developed in such a manner that viable cell counts are high enough in many instances to nearly eliminate the normal lag time. Proof of this is demonstrated by monitoring the dissolved oxygen uptake rate of the bacteria undergoing activation. The more viable cells metabolizing, the more oxygen required for metabolism. Thus a very high dissolved oxygen uptake rate indicates a large, healthy bacterial population while low dissolved oxygen uptake rate numbers indicate the reverse.

In the ex-situ method of this invention, the soil should be removed from the contaminated site and placed in windrows on top of durable liner which acts as an underliner in the subject accelerated bioremediation process. This underliner substantially prevents undesirable materials present in the ex-situ soil from leaching into the surrounding uncontaminated soil prior to the completion of the bioremediation process. It has been determined that a woven polyolefin fabric of the type exemplified by NOVA-THENE® RB616-6HD, manufactured by Polymer International (N.S.) Inc., of Truco Nova Scotia, Canada, is one of the most durable liners available for this purpose. One reason is that it will remain intact during the microenfractionation of the treated contaminated material by the hereinafter described subject apparatus.

Figure 15:
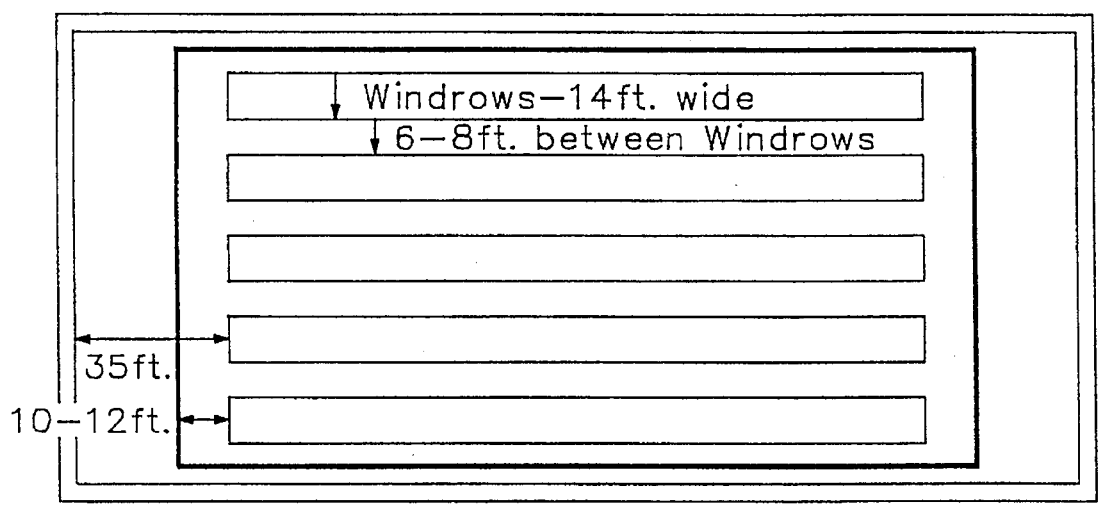
FIG. 15 is a top view of windrows formed in the treated contaminated material prior to microenfractionation.
Figure 16:
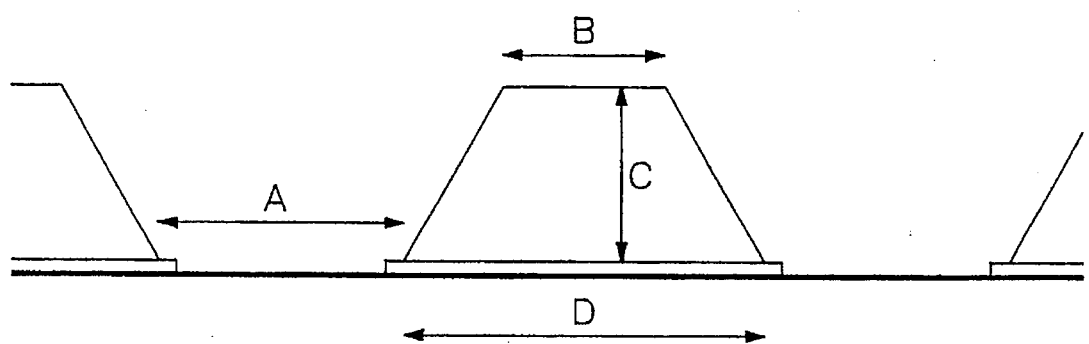
FIG. 16 is a side view of windrows formed in the treated contaminated material prior to microenfractionation.

After the liner has been laid down in a pile (on as smooth a surface as possible), a layer of sand is applied over the liner. If there are clay type soils, wood particles such as chips or sawdust are put down on liner before contaminated soil introduced and formed into windrows as shown in FIGS. 15 and 16. The sand or wood particle layer will permit complete mixing of all of the contaminated material and will overcome soil stratification. Windrows are typically spaced 6–8 feet apart. The windrows should be no wider than 14 feet and no higher than 6 feet. The above-described liner is extended out 4 feet past edge of pile with a berm of about eight inches to allow the microenfractionating equipment to straddle the pile. All rocks, chunks of concrete larger than two inches and other debris should be removed from contaminated soil prior to microenfractionation. Once the contaminated dirt has been windrowed, treatment with the chemical and/or biological amendments can commence.

SOIL ANALYSIS PRIOR TO STARTING TREATMENT

First, the soil is analyzed for contaminant, and a full agricultural analysis is done. The testing for total petroleum hydrocarbons is not in itself an easy task. The type and quantity of contaminant must be accurately revealed. The contaminant reduction requirements must also be known. In addition, a series of soil tests must be undertaken. These tests include, but are not limited to, the following:

1. Total Petroleum Hydrocarbon Levels: The amount and nature of the hydrocarbon contaminants in the soil must be first determined. These include BTEX, PCP, PAH, PCB and the like.(EPA Test Nos. 418.1, 8015, 8020, etc.)

2. Standard ⅓ Bar Moisture Retention: The test will ascertain the quantity of water this soil will retain when placed under ⅓ bar vacuum. This is a standardized test to determine the saturation point of the soil with water. Knowing this will assist in determining the quantity of moisture that can be reasonably utilized during soil treatment.

3. pH: This test will determine if the soil is acidic, basic or neutral. Neutral pH is best for biological degradation. If the soil is either too acidic (i.e. pH 6.0 or below), soil amendments will be necessary to make the soil pH more neutral (7.0 pH). If the soil is too basic (i.e. pH 8.0 or above), again, soil amendments will be necessary to make the soil pH more neutral.

4. Standard Buffer Capacity: This test will determine how much acid or base can be introduced into the soil before a pH change occurs. This information is useful because soil amendments can alter pH as can biological metabolyte materials produced during the biological treatment of petroleum hydrocarbon contaminated soil.

5. Standard Electrical Conductivity: Bacteria require a certain amount of electrical conductivity to survive and metabolize nutrients. If there is too little electrical conductivity or too much, the biological system can be inhibited or destroyed. Again, soil amendments can alter electrical conductivity if it becomes necessary.

6. Standard Sodium Absorption ratio (SAR): This test determines an estimate of the exchangeable sodium percentage of what a soil is, or what it is likely to become if the water that comprises the sample water is in that soil for long periods of time. The SAR has a good correlation to the exchangeable sodium percentage and is easier to calculate exactly (or to estimate from a few simple analysis) than is exchangeable sodium percentage. If the SAR exceeds 13, the biological system will be greatly impaired.

The purpose for the test is to determine if too much salt in the soil will inhibit biological activity by having sodium ions occupy a high proportion of exchange sites in the soil causing high pH and low water permeability. If this situation occurs, biological activity will slow or cease. Note that the use of inorganic nutrients can promote high salt content in soil due to the salt nature of inorganic nutrients. Organic based nutrients do not cause this to happen because they are not salt based.

7. Standard Organic Matter: Organic matter is required for any biological system to function properly. The organic matter can be a media of bacteria, it can supply nutrients in some cases, and it can be an indicator of biological activity. Knowing the organic matter level can help determine if additional organic matter is needed for soils treatment.

8. Standard NPK or the Soils Nutrient Tests of Nitrogen, Phosphorus, Potassium: These are the three major or macro-nutrients required for bacterial growth. The pre-treatment levels of these nutrients must be known to balance the nutrient addition properly. Hydrocarbon contaminated soil is frequently very deficient in one or more macro-nutrients.

9. Standard Micro-nutrient Profile of the Soil: In addition to macro-nutrients, a micro-nutrient profile of the soil is very useful. Macro-nutrients are elements such as sulfur, copper, iron, zinc, boron, manganese, sodium, magnesium and calcium. All of these elements are necessary for microbial growth in very small quantities. If one or more of these nutrients are absent or unavailable, bacterial activity is inhibited. Conversely, if one or more micro-nutrients is excessive, this can also be inhibitory on bacterial growth. Micro-nutrients are elements in trace quantities required by organisms for metabolism. This must be known. The soil type of the contaminated soil must be ascertained, i.e. percentage of sand, silt, or clay. Each soil type must be treated differently. For instance, straight sand may not be capable of retaining moisture; clay or fine silt may require the addition of sand or wood fiber to assisting in breaking the soil platelets apart, so that oxygen is not excluded from the system.

10. Other tests: Moisture content and temperature determinations should be made in order to determine if environmental conditions are conducive to biological activity.

11. Other Contaminant Sources: One last bit of information about the soil to be treated is very useful. It must be known if any other chemical or element is contaminating the soil in addition to the hydrocarbon contaminant. A good example of this is arsenic contaminated soil in the Pacific Northwest. This type of contamination can be natural or artificially introduced. Unfortunately, in high enough concentration, this type of contamination can greatly inhibit the necessary biological activity required for remediation. Not only is it important to know the quantity and type of additional contaminant but also the percent leachable. If the contaminant is not very leachable, it won't affect the biological system to the same extent as if the contaminant was more leachable.

EX-SITU SOIL TREATMENT

Ex-situ treatment is the removal of contaminated material to a second site, and the remediation of thereof at that second site. In providing the second site, a berm is made typically from soil, straw or concrete ecology blocks. The width and length is dependent on the area available for use in bioremediation. First, the area contained by the berm is smoothed. It is then covered with the above-described underliner in order to create an impermeable barrier between the contaminated soil and the uncontaminated soil. Next, the underliner is covered with 2–4 inches of fine sand or pea gravel or wood chips. Then, the windrows of contaminated soil 14 ft.wide and 6 ft. tall are laid out. Space must be left at sides and ends of berm for maneuvering the microenfractionating equipment. Finally, the entire windrow layout is covered with a translucent outdoor material which permits solar radiation to pass therethrough. The preferred material for this purpose is Loretex 1212 UV (clear), manufactured by Chave & Earley, Inc. of New York City, N.Y., a woven polyethylene substrate coated with polyethylene which is manufactured by The Loretex Corporation.

TREATMENT OF CONTAMINATED MATERIALS

The soil is prepared by first adjusting the pH to between about 6.0 and 8.0, preferably between about 6.5 and 7.5, and most preferably about 7.0, and is then treat with the chemical and/or biological amendments.

From the biological standpoint, a balance biological diet designed to enhance and accelerate degradation of hydrocarbon contaminants can be first provided. For instance, HH MICRO-2 or HH MICRO-51D manufactured by H & H Eco Systems, Inc. is mixed with the contaminated soil 24 hours in advance of adding bacteria. Both the HH MICRO-2 or HH MICRO-51D comprise Acidified Fish (nutrient), a sulfated molasses co-metabolite which facilitates enzyme production (sulfur and sugar), ammonium nitrate ($N_2$ source), BNB micronutrients, fragrance enhancers, and xanthan gum (prevent separation). BNB is a trademarked proprietary product manufactured by Westbridge Agricultural Products of Carlsbad, Calif., and comprises a blend of micronutrients, microbiological growth stimulators, and microbiological growth regulators. It is a concentrated microbial growth medium derived from waste products from the food industry and animal origin combined with micronutrients. A typical recipe for the HH MICRO-2 or HH MICRO-51D biological nutrients having a boiling point of 216 degree F., a specific gravity of 1.21, and a % volatile by weight of 26.8, comprises the following: 411 kg. of Fish OP4 (Acidified), 60 kg. of Molasses (Food Grade), 141 kg. of 32-0-0 Ammonium Nitrate, solution (32% nitrogen, 0% phosphorus, and 0% potassium) and 0.3 kg. of Kelzan-s Xanthan Gum (plus a fragrance enhancer). The requirements for the biological diet will be made from the soil analysis and TPH levels in the soil. In general, a total of from about 0.5 to 2.0 liters per cubic meter of the biological material is added to the contaminated material in order to achieve the maximum cost-to-effectiveness relationship regarding facilitation of the accelerated remediation.

H & H Eco Systems, Inc. is also the distributor of hazardous waste degrading bacteria. These bacteria are generated from cultures found in nature, and they are capable of degrading many organic compounds. Examples of these bacteria include Solmar, ERI, BioScience and all proprietary trademarked formulas comprising pseudomonades and/or bacilli sp., such as various strains of pseudomonas aeruginosa and/or bacillus subtilis, manufactured by Westbridge of Carlsbad, Calif. The bacteria should be checked to determine the formula most appropriate for specific site. Due to the cost of such bacteria, only from about 0.5 to 5 ounces of a bacteria such as AGRI-SC is employed in the subject chemical and/or biological amendments. The bacteria are typically started 12 hours in advance of soil application. Here is a typical procedure for starting the bacteria:

a. Add water at a rate of 1.5 gallons for each 1 lb. of bacteria
b. Add HH MICRO-2 or HH MICRO-51D nutrient at recommended rate for the given site.
c. Add ½ lb. of contaminated soil to mixing tank.
d. Add air to mixing tank until applied in 6–12 hours.

After the pH of the contaminate soil is balanced, apply balanced biological diet and mix thoroughly. Apply the bacteria. The pile should be covered with Loretex 1212 UV. The soil temperature should preferably remain above 7° C. and below 38° C. for the bacteria to remain active. Lower temperatures may cause the bacteria to revert back to their dormant stage and higher temperatures will degrade or kill the bacteria. A minimum of about 20%, up to about 40% moisture, and preferably from about 25% moisture up to about 35% moisture, and most preferably about 30% moisture, is required for accelerated bioremediation.

Regarding soil types, in heavy clay or silt add alder or firwood chips, or pea gravel. Alder or fir sawdust can also be used. In sandy soil, there are no additional requirements.

TREATMENT CELL CONSTRUCTION

The treatment cell design of choice is a windrow configuration with the soil pile dimensions. For example, a windrow configuration conforming to 14 feet wide at the base, 5 feet wide at the top and a height of no more than 6.5 feet. Windrow length is limited only to available space at a given job site. The windrow should be placed on a level, smooth, firm surface. An underliner of the must be used and must be a continuous piece for surrounding environment protection. The edges of the underliner must be bermed 8" to 10" to prevent any leachate that may be produced during treatment form escaping. The berm material may vary, but a ridge of sand under the underliner and completely surrounding the contaminated soil works very well. Typically, when using this treatment method, no leachate collection basin has been necessary. By using sand or a similar textured material, the underliner covering the bermed section can be driven on by the microenfracting apparatus without damage to the underliner.

If wood fiber is added, alder chips have preference. Cedar should not be used. The wood chips work most efficiently when a hard packed layer is installed (18" to 20") over the underliner prior to soil installation. This particular design allows the microenfractionating apparatus to be lowered through the soil, into the wood chips, and provides for excellent dispersion as well as 100% mixing of the treated contaminated soil. It also allows another benefit. By stirring midway through the woodchips, the underliner is in no danger of damage from the machine.

After the underliner structure and windows are set up, the soil amendments—nutrients, surfactants, and bacteria (when necessary)—may be added. The method for dispersion of soil amendment is via broadcast spraying by the H&H Eco Systems spray unit or equivalent.

A one piece top cover made from Loretex 1212 UV material is very resistant to damage from solar radiation. This material also transmits the maximum amount of solar radiation to the contaminated soil, thus assisting with elevated soil temperatures required of the bacteria for rapid metabolism. This property is very useful in promoting bacterial activity during periods of low ambient air temperature.

If the soil consists of clay, silt or any combination thereof, sand or wood fiber addition is highly recommended. Either of these substances will inhibit compaction of these "tight" soils. For very heavy clay concentrations, i.e. fatty clay, wood fiber is recommended due to its superior clay platelet separation characteristics. The wood fiber will also tend to generate heat as it degrades. This is a very useful characteristic to enable the accelerated bioremediation process to work through the winter actively. Soil pile temperatures in excess of 21 degrees C. have been generated during the winter where the ambient temperatures ranged from −9 degrees C. to 5 degrees C. In all cases, the soil texture was silt, silt and clay, or fatty clay. Although there are several other contributors to soil heat during degradation, such as solar radiation, biological energy from petroleum hydrocarbon degradation and heat from surfactant degradation, the wood fiber is a very significant factor.

CHEMICAL AMENDMENT

The addition of certain specific surfactants, when used in the proper ratios, assists in the dispersion of the hydrocarbons throughout the soil, thus increasing the surface area of the contaminant to allow the bacteria to utilize the contaminant as a metabolite. As the surfactants of choice are also biodegradable, the addition of the surfactants in a controlled biosystem should pose no threat to the environment. Also, economically, the addition of the surfactant has very little impact because the concentrations rarely exceed 350 ppm per application. Additional benefits of the surfactant are its chelating properties that make the nutrients in the contaminated soil, whether natural or added, more available to the bacteria doing the contaminant degradation.

The surfactant system of choice for use in petroleum hydrocarbon contaminated soil is Simple Green® manufactured by Sunshine Makers, Inc. This material is very biodegradable and environmentally friendly. In addition, Simple Green® has a number of properties which make its use attractive for biodegradation of petroleum hydrocarbons. It has chelating properties which tend to make some nutrients more biologically available. Simple Green® also has the ability to chemically couple water molecules with hydrocarbon molecules, thus assisting in the bioavailability of the hydrocarbon for bacterial metabolysis. About 0.2–0.4 liters/cubic meter of the above-described surfactant seems to be an optimum amount for use in the chemical and/or biological amendment of the present invention.

NUTRIENT AMENDMENTS

Micro-nutrients, such as those produced by H & H Eco Systems, are designed to take advantage of bacteria's natural ability to control the biosynthetic pathways. In order for bacteria to survive in a given environment, i.e., an ex-situ biological treatment of hydrocarbon contaminated soil, the desired microflora must reproduce more rapidly than any other organism in the same environment. H & H Eco Systems' nutrients are formulated to provide the desired microflora with as many of the essential nutrients as possible.

Because the supply of available energy is generally the limiting factor in bacterial growth in nature, it is crucial that the bacterial cell synthesize the maximum amount of cell material from a limited supply of energy. Bacterial cells may synthesize cell structure by elaborate control mechanisms of their biosynthetic pathways. If the biosynthetic products of bacterial cells are present in large concentration, the bacterial cell can cease synthesis of these products for cell synthesis and utilize the products directly. If the organism can utilize rather than synthesize needed end products of biosynthetic reactions that may be available from the environment, energy can be conserved. By utilizing organic based nutrients in H & H micro products, the bacteria degrading the petroleum hydrocarbons are actually providing the amino acids and other end products required for cell reproduction rather than requiring the bacteria to synthesize their own end products.

If inorganic nutrients are utilized in a biological treatment of petroleum hydrocarbons, the bacteria must utilize a great deal of energy to synthesize the end products required for reproduction rather than the more efficient direct utilization of the H&H organic based nutrients. By providing a medium composed of amino acids/micro-nutrients/other end products of biosynthetic pathways, the hydrocarbon degrading bacterial cells actively take up these metabolites through their permease systems which requires a minimal expenditure of energy. Simultaneously, the cells close down their own biosynthetic routes thus conserving energy to channel it in the rapid synthesis of macromolecules. Under these conditions, the cells divide at their most rapid rate. By providing all of the tools necessary for the bacterial cells to produce the macromolecular catabolic enzymes required to degrade the hydrocarbon, H&H Eco Systems micro-nutrients ensure the most rapid reduction of the contaminant. The other macromolecular structures include amino acids which is required for bacterial cell reproduction. If these building blocks are present, as they are in H&H Eco Systems micro products, the most efficient biological process results.

In addition, cells do not synthesize catabolic enzymes unless the substrates that these enzymes degrade are present in the environment. For this reason, the nutrients will act as a surrogate substrate for the stimulation of specific catabolic enzyme production by the bacterial flora for the express purpose of degrading petroleum hydrocarbons.

The nutrient amendments required for a specific job will depend on what the analytical workup described above indicates. The main ingredient to any nutrient supplement will be the HH micro product. H&H Eco Systems has a number of formulations for specific contaminants and conditions. As previously indicated the micro products are primarily organic-based and contain both macro- and micro-nutrients, as well as co-metabolytes, growth regulators and amino acids. These products have a very low pH (2.5 to 3.0) and should be neutralized to pH 6.0–8.0 prior for best results.

It has been determined that the most effective pH neutralization compound is 45% potassium hydroxide solution. This material is very easy to control chemically and has the added benefit of supplying additional necessary potassium to the biological system.

If the petroleum hydrocarbon concentration is very high, multiple nutrient and surfactant application may be necessary. The nutrient and surfactant quantities recommended are based on carbon to nitrogen ratios. However, high hydrocarbon contaminant levels are not a problem if the nutrients and surfactants are "metered in" with specific dosages during soil mixing operations. The surfactant should be kept at low level, i.e., at less than about 1000 ppm, preferably less than 750 ppm, and most preferably less than 500 ppm total concentration, or it becomes inhibitory to bacteria. The H&H micro products are limited to 1000 ppm for the same reason. Both may be added in multiple applications, however, because biological activity will consume both the nutrient and surfactant while degrading the hydrocarbon. If wood fiber is used, additional wood fiber may be necessary during the course of the remediation because it will be degraded as well.

MICROENFRACTIONATION

Soil microenfractionation is one of the most critical aspects of biological treatment of petroleum hydrocarbon contaminated soils. The reason this is important is that most petroleum hydrocarbon contaminated soil is very unevenly contaminated or fractions in nature. The hydrocarbons will frequently form "globs" of contamination of high concentration in the soil. These "globs" repel water as well as maintaining a high enough concentration of petroleum hydrocarbon to inhibit bacterial growth except at the contamination interface. The contamination interface will generally provide conditions favorable for bacterial growth with both available water and relatively low hydrocarbon concentrations. The biological degradation rate is thus controlled by the active surface area of the hydrocarbon contaminant.

One conclusion that could be discerned from this is that, if the surface area of the hydrocarbon contaminant was increased, the rate of biological activity would also increase. The apparatus used for that purpose in the subject invention very actively disperses the hydrocarbon contaminant throughout the soil matrix. The apparatus, known as the HH SYSTEM 614 Turborator, is manufactured by Frontier Manufacturing Company and is capable of increasing surface area by a factor of at least about $1 \times 10^6$ with one two-way mixing pass. This same mixing action can disperse all of the soil amendments in the same manner. No other soil mixing machine currently in use is capable of this type of mixing. The HH SYSTEM 614 Turborator does not just "mix" the soil; it literally homogenizes and aerates it. With this corresponding increase in surface area, the biological degradation rate will increase by several thousand times. This process is defined, for purposes of this invention, as "microenfractionation".

After all additions are added with the exception of bacteria (bacteria should be added 24 hours after other additions for maximum survivability), microenfractionation needs to take place. For example, after application of nutrients and chemicals using a spray system such as the HH System 1000 sprayer, then an apparatus, such as the HH SYSTEM 614 Turborator, can start its work. In order to achieve the maximum effect, the microenfractionating apparatus preferably must be passed through the soil matrix at least twice. The most efficient method is for the machine to pass through the soil in one direction, then, turn on its axis and pass through the soil in the opposite direction. This way the soil displacement (longitudinally) is essentially negated.

Stirring intervals for the contaminated soil will depend on the rate of biological activity. As the bacteria metabolizes, it uses up oxygen. When the oxygen is depleted, the biological system will switch to anaerobic digestion (inefficient and undesirable) until additional oxygen is available. If the biological activity/rate of metabolism is very high, frequent stirring intervals are warranted, possibly as much as three stirring per week. If all of the treatment specifications are adhered to, very rapid biological metabolic rate will ensue. To keep this activity at a high rate for the most rapid biological reduction of petroleum hydrocarbons, the extra stirring is required to aerate the soil. Additional/more frequent nutrients and chemical requirements may be necessary depending on the soil analysis/testing done as the project progresses.

The aerating capability of the subject microenfractionation system is very important. First of all, it supplies and encapsulates air into the soil pile for an oxygen source. It also purges the soil of carbon dioxide at the same time. Carbon dioxide is produced during biological degradation of petroleum hydrocarbon. Carbon dioxide concentrations in the soil can lower the pH, and promote anaerobic conditions, both to the detriment of biological systems.

In the past, machines such rototillers, trackhoes, discs, and the like were used in remediation to "stir" contaminated soil. In the case of trackhoes, for example, this procedure was extremely time consuming, frequently taking all day to stir 500 cu. yards of soil. This factor alone greatly limited the economics of attempting a large remediation site. The soil handling would probably be cost prohibitive. While this method did a much better job of stirring than rototillers, it still did not address the stirring problem completely. Ideally the soil should be very thoroughly mixed with the soil amendments. The track hoe did not totally address this. It was also too costly as well as inadequate in aerating the soil. Extensive research was done to find soil mixing equipment that would adequately address all of the requirements for efficient biodegradation of hydrocarbons. A variety of rototillers, track hoe attachments, pug mills, batch mixers and shakers were researched. While some of the machines identified had merit, daily mixing volumes were limited. Also, all of the machines were inadequate in aeration.

The HH System 614 Turborator mixes nutrients, bacteria, other amendments and contaminated soil into a treated microenfractionated material. Hydrocarbons will rarely contaminate soils in a uniform manner due to causes ranging from varying soil permeability to the water insoluble nature of hydrocarbons. Reducing the normally fractious nature of hydrocarbon contamination in soils is a task that this apparatus can accomplish very effectively. The mixing action simultaneously mixes the bacteria, nutrients and any other soil amendments with the hydrocarbon contaminated soil. This action brings the bacteria, nutrients and any soil amendments into direct contact with the contaminated soil to allow the most efficient biological system. The HH System 614 Turborator also aerates the soil very thoroughly as well as purging petroleum hydrocarbon degradation bi-products such as $CO_2$ from the soil to ensure that the biological system remains in its most efficient aerobic mode. It is also much faster—it can "microenfractionate" 500 cubic yards of soil per hour rather than "stir" the 1000 cubic yards per day that the track hoe is capable of doing.

Figure 1:
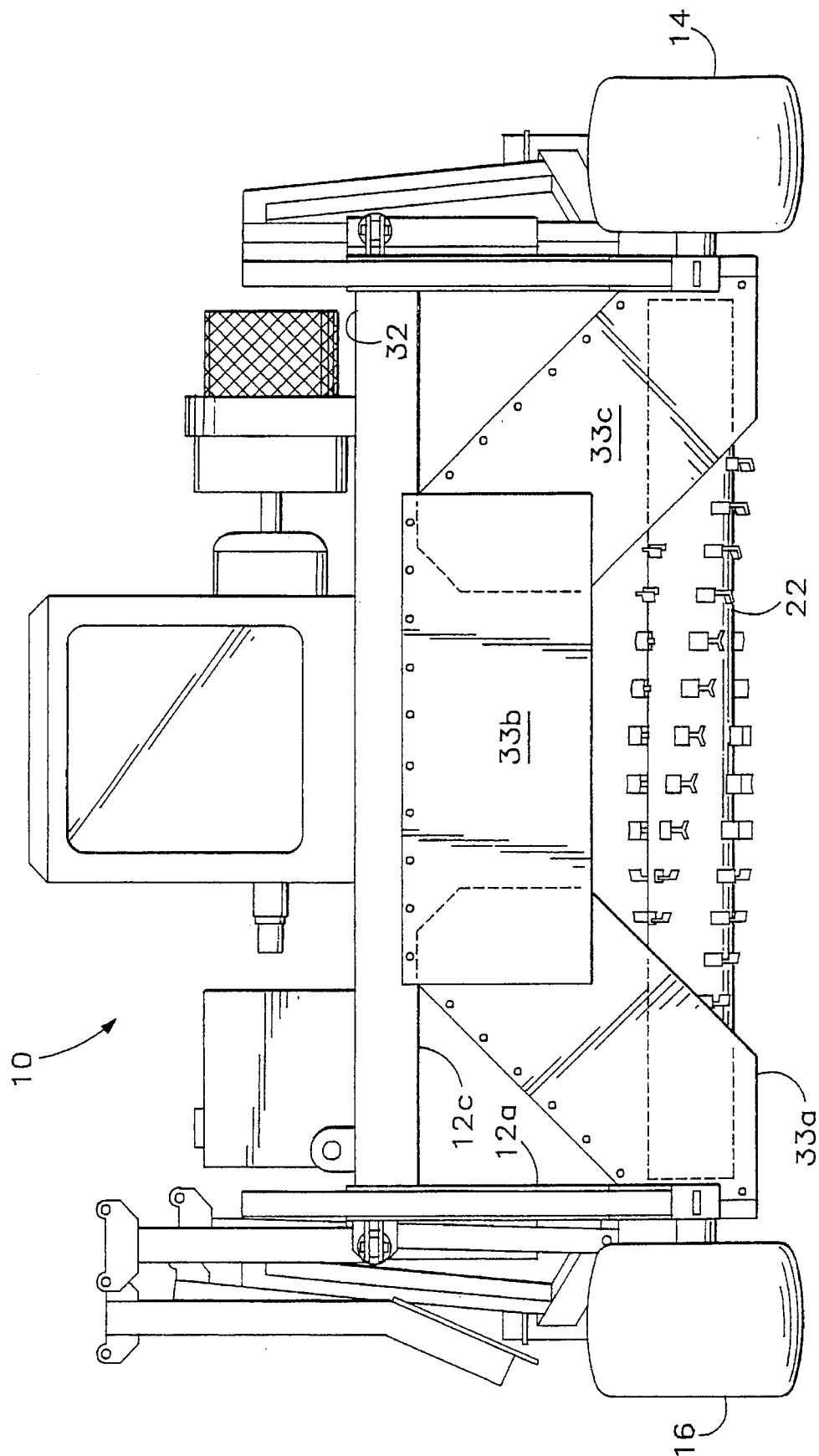
FIG. 1 is a front view of the preferred apparatus for use in the present invention.
Figure 2:
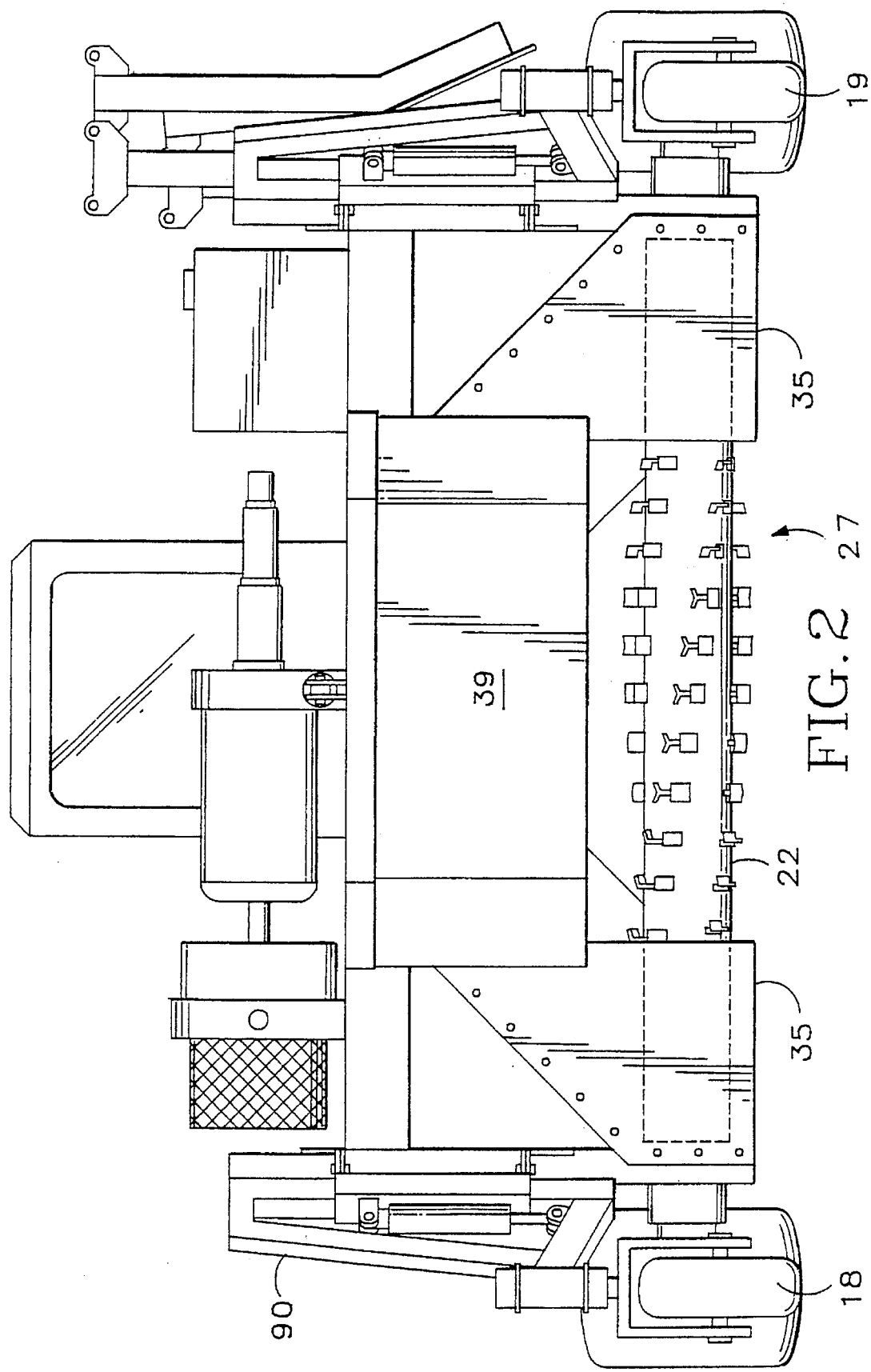
FIG. 2 is a rear view of apparatus of the apparatus of FIG. 1.
Figure 3:
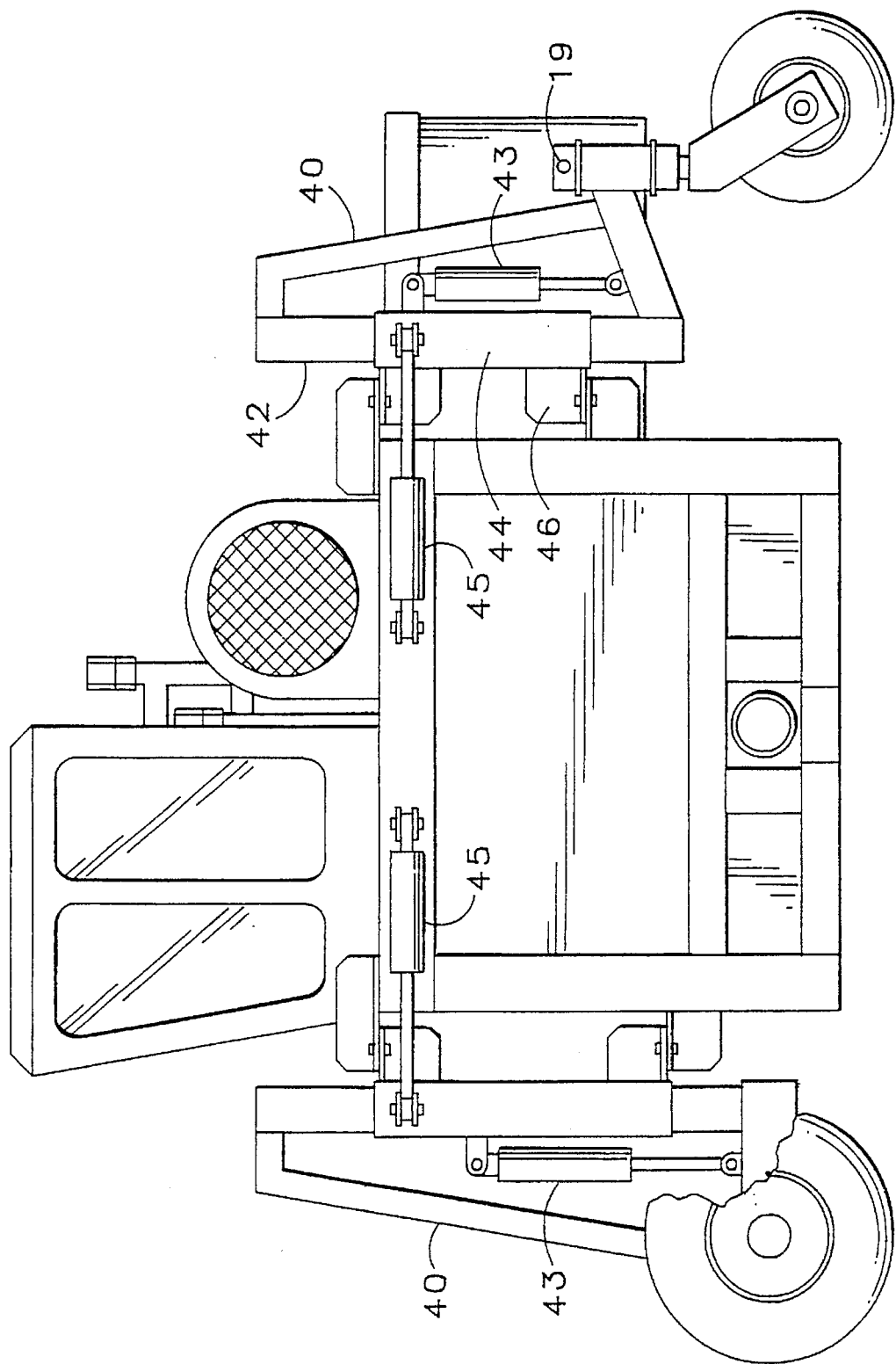
FIG. 3 is a left side view of the apparatus of FIG. 1.

Referring now to FIGS. 1 and 2, a microenfractionating apparatus for use in the present invention is shown generally at 10. The apparatus 10 includes frame 12 which is assembled from ladder-type left, right, and top subframes, 12a, 12b and 12c respectively. In a two-wheel drive system, frame 12 is supported at its front end by left and right drive wheels 14 and 16, and at the rear by left and right caster wheels 18 and 19. In a four-wheel drive system (not shown), left and right drive wheels are also provided at the rear of frame 12, and a similar drive system, as hereinafter described for driving drive wheels 14 and 16, is provided to drive both the front and rear set of drive wheels. Each wheel mounted on an axle is journaled into a supporting frame assembly 40. Each rear caster wheel is mounted into its respective frame assembly 40 by a vertical shaft journaled into frame assembly 40 as shown in FIG. 3. Each rear caster wheel may be locked into a transverse position by locking pin assembly 19 when desired as described below. Each frame assembly 40 includes an upright member 42 slidably received within a complementary vertical sleeve 44 of a mounting assembly 46. Frame assembly 40 may thereby be raised or lowered relative to the ground on upright member 42 by actuation of hydraulic cylinder 43, allowing the ground clearance of apparatus 10 to be raised or lowered during operation as more fully described below. Mounting bracket 46 is in turn pivotally mounted on frame 12 at brackets 48, allowing each frame assembly 40 and wheel to be pivoted by actuation of hydraulic cylinder 45 for different modes of operation as described below. An alternative design for the wheel frame assemblies 40 is shown in FIGS. 4A and 4B. Note that in the alternative frame assembly design for drive wheels 14 and 16, frame assembly 40 does not pivot, but rather is moved rearward by hydraulic cylinder 45 and raised up by hydraulic cylinder 43 to its stowed position.

Figure 5:
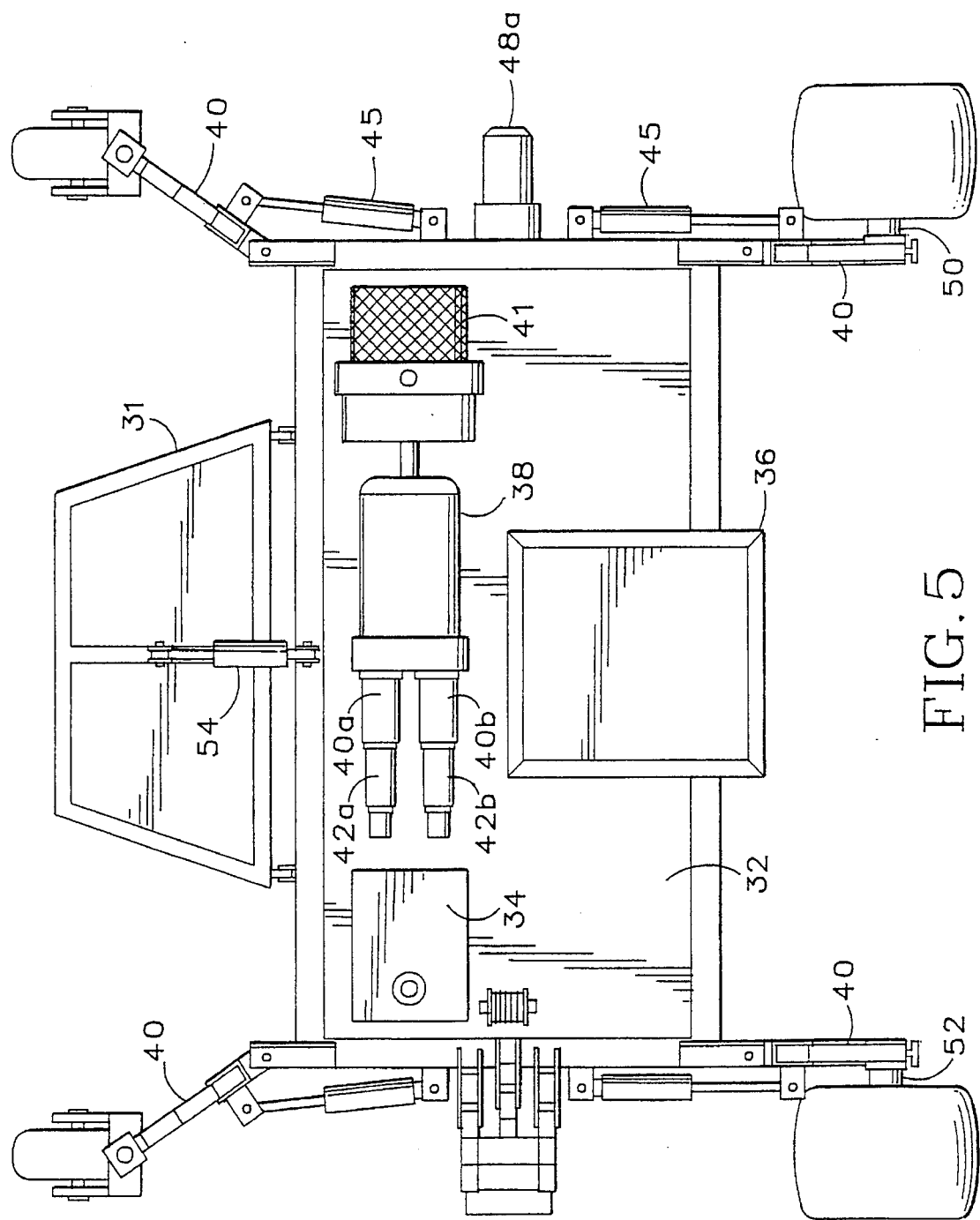
FIG. 5 is a top view of the apparatus of FIG. 1.

As best seen by reference to FIG. 5, frame 12 includes upper deck 32 on which are mounted fuel tank 34, operator's cab 36, hydraulic oil tank 37, engine 38, and hydraulic pumps 40, 42 and 44. As readily appreciated by those skilled in the art, suitable auxiliary equipment for operation of the engine and drive components in dusty environments is also provided, such as rotating self-cleaning screen 41 of the cooling system of engine 38. Power for the operation of apparatus 10 is provided by hydraulic pumps 40, 42 and 44, which are driven by engine 38, preferably a 435 hp diesel engine such as Model NTH8559355, manufactured by Cummins. Each hydraulic pump 40a and 40b, Sauer Sundstrand Series 90, Model 100, delivers pressurized hydraulic fluid to each of drum assembly drive motors 48a and 48b to reversibly drive rotating drum and paddle assembly 22 from each end. Hydraulic pumps 42a and 42b deliver pressurized hydraulic fluid to left and right drive motors 50 and 52 respectively. Pump 44a delivers pressurized fluid to hydraulic cylinders 43 for raising and lowering frame 12, while pump 44b provides pressurized fluid for operating hydraulic cylinders 45, and hydraulic cylinder 54 for raising and lowering tail section 31. Left and right drive motors 50 and 52 are separately controllable by the operator for steering and for driving left and right drive wheels 14 and 16 respectively through an appropriate drive assembly of a suitable design as could be readily determined by one skilled in the art.

In the preferred embodiment, a planetary gear assembly, Model No. W-3 as manufactured by Fairfield is used on each the left side and right side drive wheel and motor assembly. The left side planetary drive assembly differs from that of the right side only in that it is rendered free wheeling for reasons described below by operation of an external T-handle. Apparatus 10 is steerable and driveable forwardly, rearwardly, and sideways as described below by virtue of the fact that each drive wheel is driveable forwardly and rearwardly independently of the other by appropriate hydraulic controls of standard design and well-known to those skilled in the art.

The apparatus 10 exhibits an efficiency of operation resulting from incorporation of a relatively long drum assembly, 17 feet or more for example. Accordingly, the overall width of the apparatus 10 will be even greater than the drum length, while the overall length of the frame of the apparatus is preferably no greater than 8'6". While providing more efficient operation by requiring fewer passes to process a given amount of contaminated material, the overall width of prior art apparatus prevents them from being driven through standard fence gates between adjacent fields, and requires that they be transported over public roads by truck and trailers designed for transporting heavy equipment. The present invention overcomes these limitations and cost disadvantages of prior art apparatus by providing for the first time a apparatus which may be driven sideways under its own power through standard fence gates or over public roads for short distances, and which may be towed for longer distances over public roads when necessary. The means of configuring the present invention for so doing will now be described.

As described above and best seen by reference to FIG. 5, each wheel is mounted on a frame assembly 40 which is pivotable between a first position for accommodating forward and rearward travel of apparatus 10, and a second transverse position for accommodating sideways travel of the contaminated assembly 40 is moved between the first and second positions by a dedicated hydraulic cylinder 45, which is controlled by means of appropriate controls (not shown) from operator's cab 36.

Figure 14:
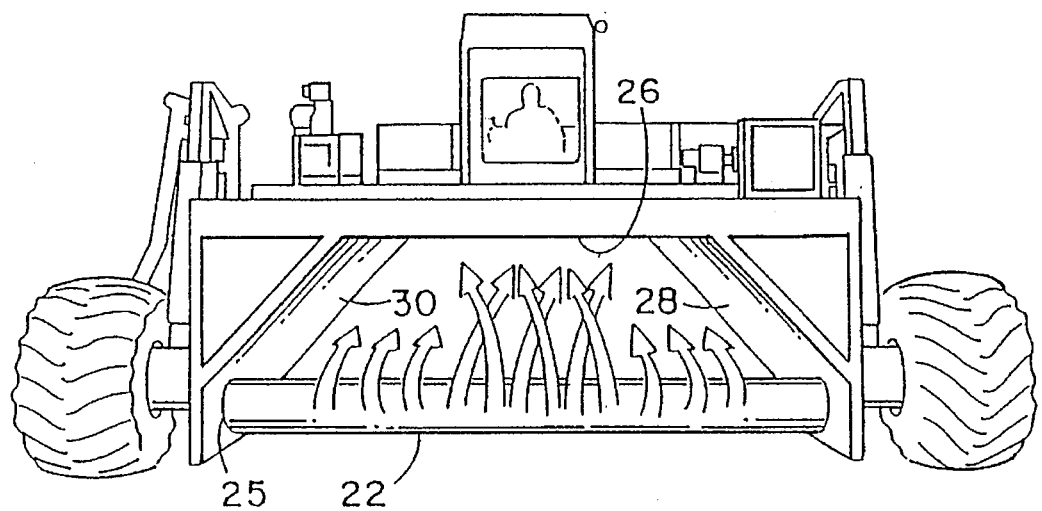
FIG. 14 is a front perspective view of a contaminated materialer according to the present invention, having the drapes removed to expose the chamber and drum assembly.

Referring now to FIGS. 1 and 14, drum assembly 22 is mounted transversely within chamber 24. Chamber 24 is an open-ended housing consisting of a top wall 26, left and right side walls 28 and 30, and tail section 31 (FIG. 5). Front opening 25 is partially shrouded as shown in FIG. 1 by front drapes 33a–c. In the preferred embodiment, screened openings 23 are provided in left and right side walls 28 and 30 ahead of drum 56 to permit additional air to be drawn into chamber 24 during operation. Tail section 31, essentially a rearwardly extending projection of chamber 24, extends rearwardly from rear opening 27. Tail section 31 may be described as a generally planar frame having rearwardly and inwardly extending side members pivotally attached to frame 12 at one end, and to lateral member at their outer ends. Drapes 39 are hung from each side member and the lateral member as best seen in FIG. 2. The drapes may be made from any suitable material. In the present embodiment, they are fabricated from grade 2 SBR in the form of 5/16" thick conveyor belt material. Tail section 31 is pivotable by hydraulic cylinder 54 between a lowered operational position and a raised stowed position for use during transport of the apparatus. Rear drapes 35 are hung from each side and the rear of tail section 31 and from angled frame members defining rear opening 27 as shown. Chamber 24 serves to contain direct the air streams and contaminated material during operation of apparatus 10, and to reform the contaminated material into a windrow after mixing and aerating as more fully described below.

Drum assembly 22 is journaled at opposite ends in left and right subframes 12a and 12b. Hydraulic motors 48a and 48b are mounted on left and right subframes 12a and 12b, and reversibly drive drum assembly 22 by means of shafts 49a and 49b when supplied with pressurized hydraulic fluid from hydraulic pumps 40a and 40b as described above. Drum assembly 22 includes drum 56, a hollow cylinder having closed ends, onto which are welded shafts 57a and 57b (not shown). Shafts 57a and 57b are journaled into frame 12, and drivably connected with drum assembly drive motors 48 as described above. Each of shafts 57a and 57b are journaled into its respective subframe by means of a four bolt flange-type tapered roller bearing 91 such as Model FB 900 manufactured by Browning company. Each bearing 91 is fitted into a corresponding hole in left and right subframes 12a and 12b. A split ring collar 92 is fitted into circumferential recesses 96 on each of shafts 57a and 57b, and bears against the protruding rotating race 94 of the tapered roller bearing to counteract spreading forces exerted on subframes 12a and 12b. Drum 56 thereby functions as a tension member in frame 12 counteracting spreading forces represented in FIG. 7A by force arrows 102a and 102b. This novel use of drum 56 as a tension member saves the weight of additional structural members which would otherwise be required to counteract spreading forces on subframes 12a and 12b, and allows a lower overall height which further accommodates towing the composting apparatus on public highways.

Turning now to FIGS. 8–12, a plurality of left and right paddles 58 and 60 respectively, and center paddles 62 are mounted on the outer cylindrical surface of drum 56 as shown. The paddles are preferably arranged in four evenly spaced helical rows along the length of the drum, each row traversing 90° about the drum from one end to the other. In a second embodiment shown in FIG. 9A, the paddles are arranged in four "V-shaped" rows. The V-shaped rows of paddles serve to eliminate transverse steering torque on the composter which may be experienced with the use of helical rows where one end of the paddle row engages the composting material prior to the other. The V-shaped rows are oriented so that paddles at each end of the row engage the compost material simultaneously, eliminating any steering effect resulting from paddles on one end of the drum engaging the compost material before the other. Additionally, the paddles of each V-shaped row are offset from those of adjacent rows to minimize bypassing of compost material past the drum. In one embodiment, the paddles in each row are spaced at 12" intervals. The corresponding paddles of adjacent rows are offset 3" from one another. Offsetting of the paddles in this manner promotes complete mixing and aeration since the compost material at every point along the entire length of drum 56 is directly in the path of at least one paddle.

It is to be understood that more or less rows of paddles may be used. Left and right paddles 58 and 60 are mounted generally to the left and right of the center point of the drum respectively, while center paddles 62 are mounted along a central portion of the drum. Center paddles 62 are preferably interspersed with the left and right paddles along portions of the drum as shown in FIG. 9. Minor variations in the number and arrangement of center paddles interspersed with left and right paddles are possible in accordance to the present invention.

Each paddle has a base section 64 by which it is pivotally attached to bracket 66, which in turn is welded to drum 56 as shown in detail in FIG. 13. Each paddle is additionally secured in position by a shear pin 68 inserted into hole 70. Shear pin 68 serves to release the paddle to pivot rearwardly if impacted by a solid object during rotation of drum assembly 22. A deflector plate 71 is attached at a rearward angle to a forward edge of bracket 66. Each paddle includes a cutting edge 72 formed on the leading edge of paddle body 74. Extending transversely from the trailing edge of left and right paddles 58 and 60 is a single paddle portion 75 extending inwardly toward the longitudinal center of drum 56. Center paddles 62 each have a pair of opposed paddle portions 78 extending outwardly toward opposite ends of drum 56. The paddle portions are preferably disposed at an angle slightly less than perpendicular relative to the paddle body. Each paddle portion serves to generate an air stream directed upwardly of the drum and in the direction of the free end of the paddle when the drum is rotated in a direction such that the paddle travels upwardly and then rearwardly in its circular path around the drum. Stated slightly differently, the normal direction of rotation of the drum assembly is in the opposite direction of wheel rotation when the apparatus is being driven forward.

Figure 4:
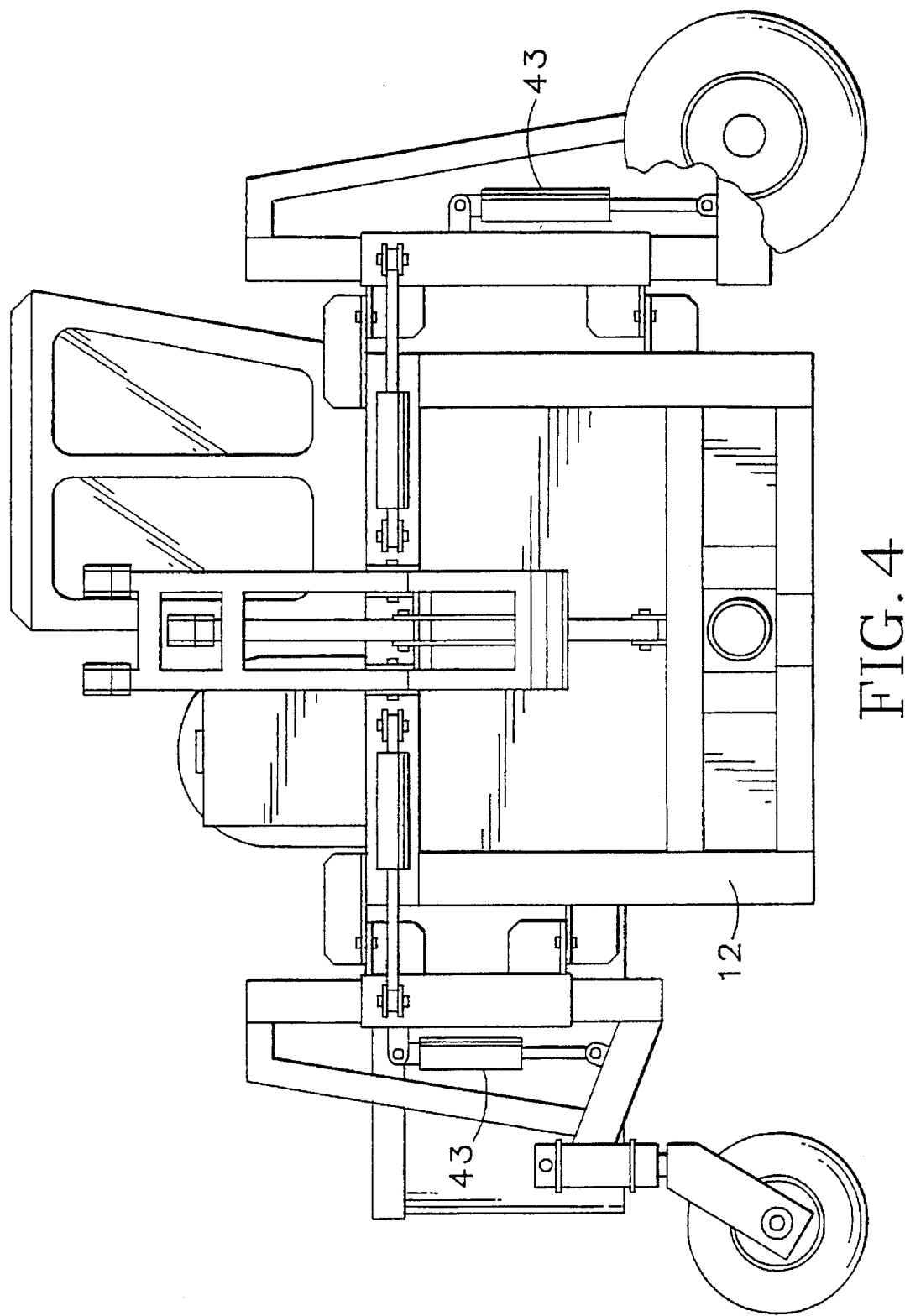
FIG. 4 is a right side view of the apparatus of FIG. 1.
Figure 6:
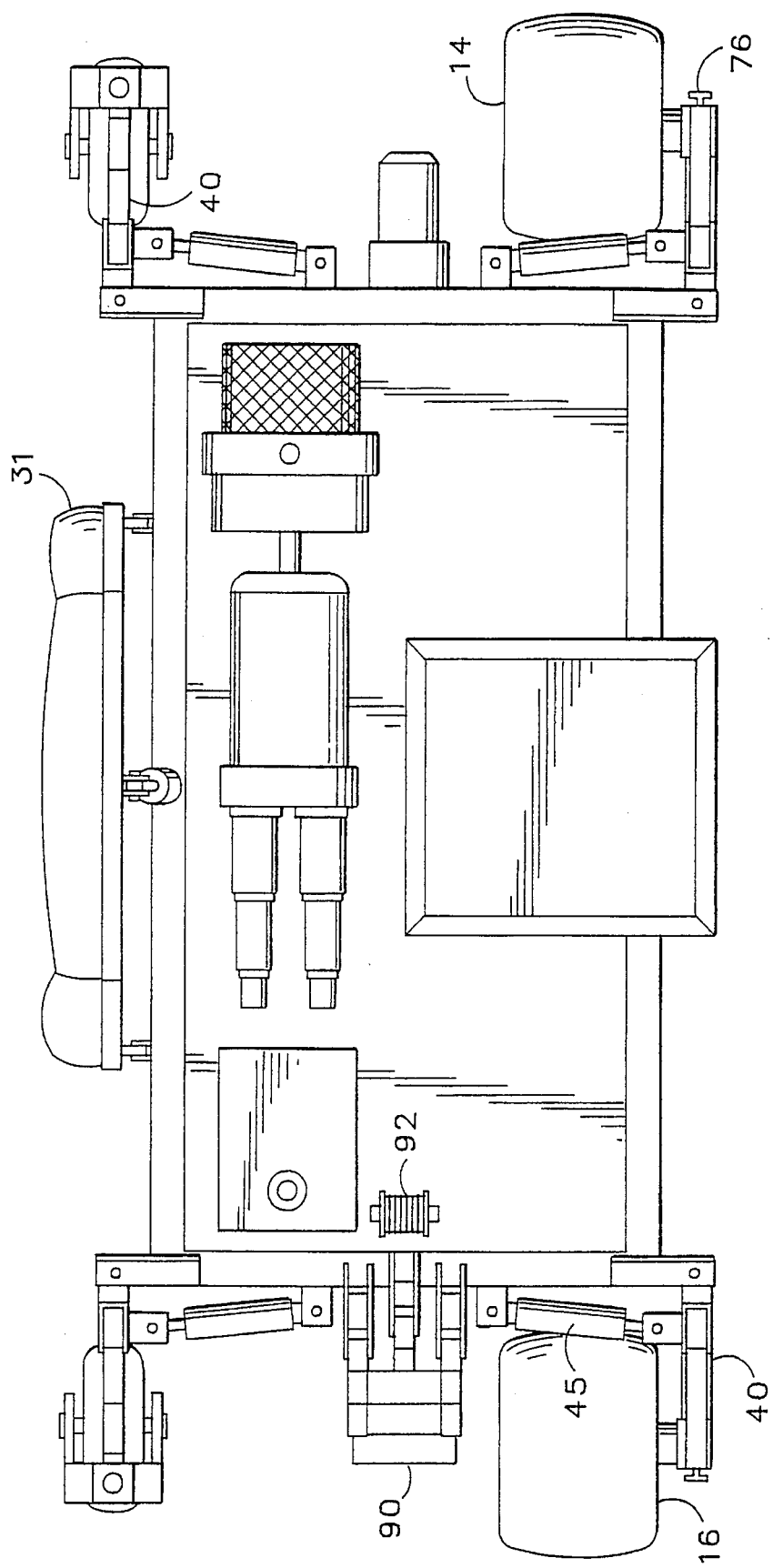
FIG. 6 is a top view of the apparatus of FIG. 1 configured for being driven sideways.

Having described the construction of the preferred embodiment, its operation will now be explained. The primary function of apparatus 10 is to microenfractionate the contaminated material. Referring now to FIGS. 4 and 6, to configure the apparatus for being driven sideways, each hydraulic cylinder 43 is activated to lower frame 12 onto the ground and to raise each wheel several inches above the ground. Tail section 31 is retracted to its raised stowed position by hydraulic cylinder 54. Each frame assembly 40 is pivoted to its transverse position as shown in FIG. 6; left and right drive wheels 14 and 16 are thereby aligned transversely, as are left and right rear caster wheels. Left drive wheel 14 is then drivably disengaged from left drive motor 50 by pushing T-handle 76 inward to disengage the planetary gear drive as discussed above. Each hydraulic cylinder 43 is then activated to lower each wheel and raise frame 12 above the ground. Apparatus 10 is now configured for being driven sideways. It is propelled in this configuration by right drive wheel 16, now facing in the direction of "forward travel", which by virtue of being fitted with flexible hydraulic supply and return lines is operable in the transverse position. Steering is accomplished by operation of hydraulic cylinder 45 to "swing" right drive wheel 16 slightly as required to adjust the direction of travel. After arriving at the desired location, the apparatus is reconfigured to its apparatus mode by reversing the foregoing procedure.

Figure 7:
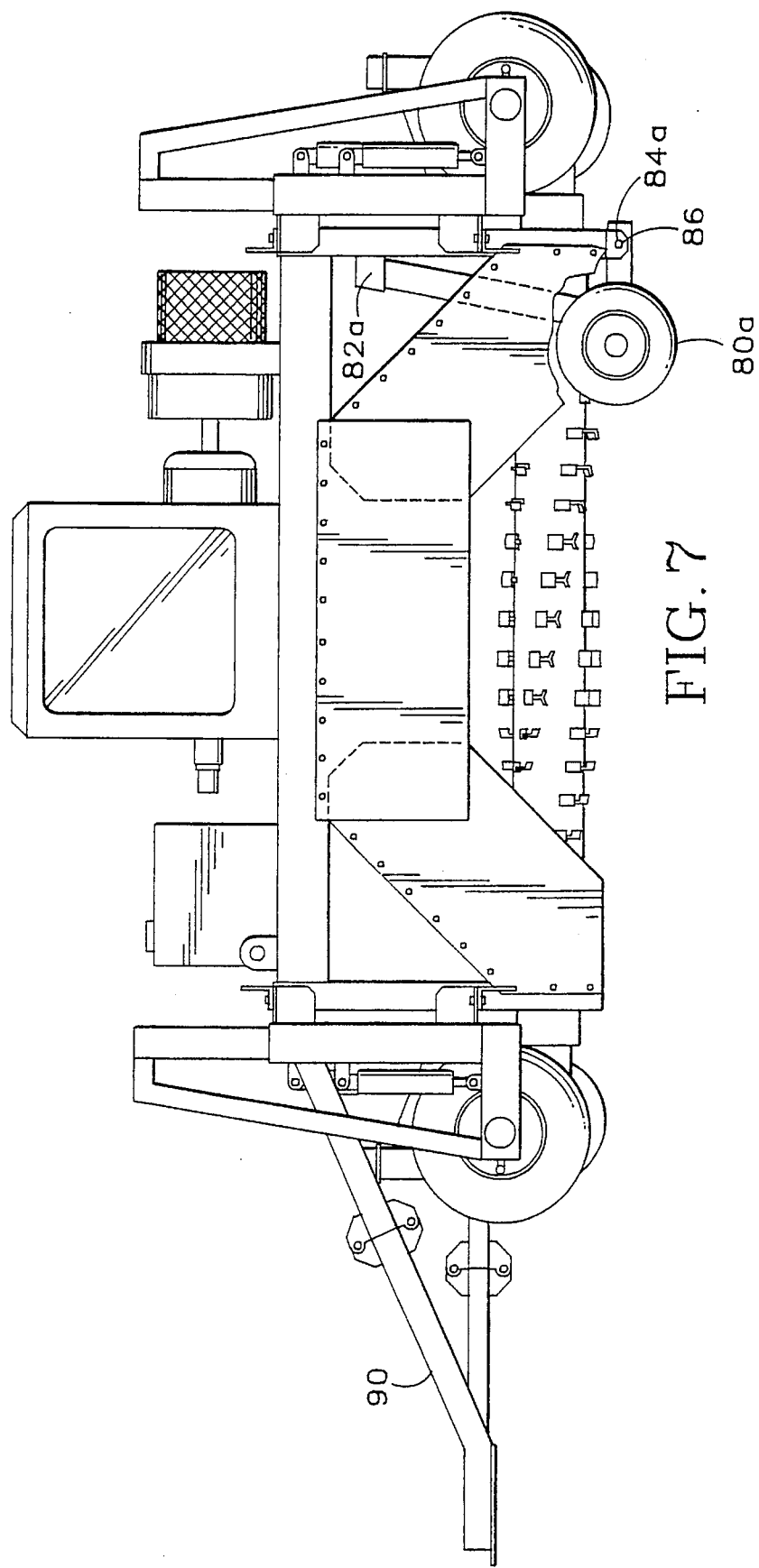
FIG. 7 is a front view of the apparatus of FIG. 1 configured for being towed sideways.
Figure 9A:
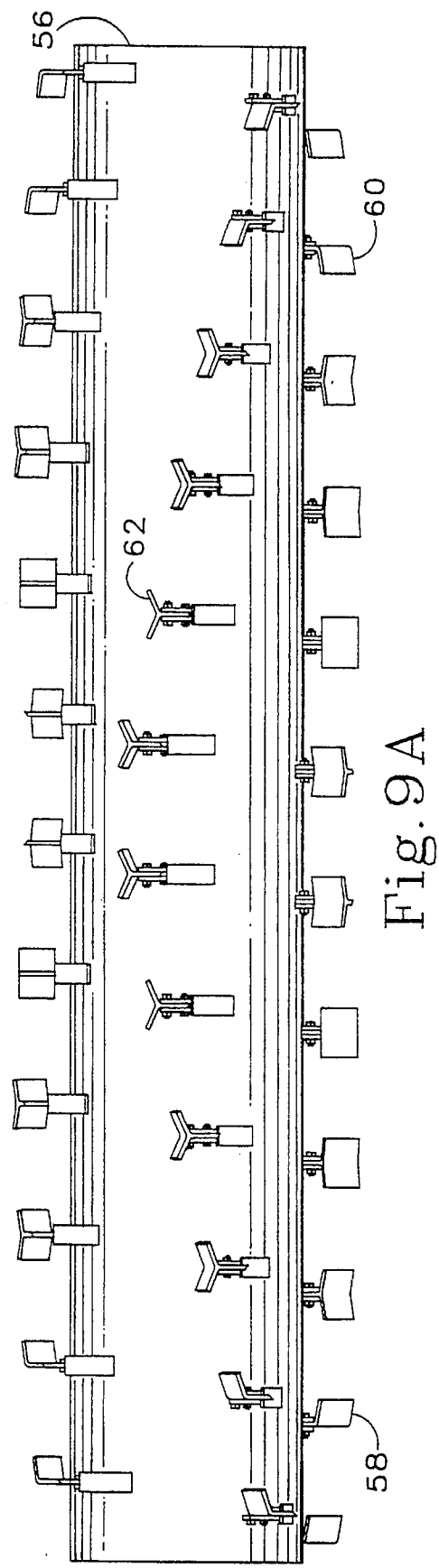
FIG. 9 is an enlarged sectional view of the center portion of the drum and paddle assembly, showing the counter-rotating vortex-like airstreams generated when the assembly is rotated.

If it is necessary to transport the apparatus a greater distance, a second transporting configuration is provided which allows the apparatus to be flat-towed by a truck. As before, each wheel is raised above the ground, pivoted to its transverse position, and the wheels lowered, raising frame 12 above the ground. Left drive wheel 14 is drivably disengaged as before, and left rear castor is locked against castoring action by pin assembly 19. As best seen in FIG. 7, a pair of auxiliary towing wheel assemblies 80a and 80b are then mounted on the right side of frame 12 by being inserted into channels 82a and 82b, and yokes 84a and 84b respectively, and secured therein by locking pins 86. Auxiliary towing wheel assemblies 80a and 80b are additionally secured by lateral link 86 which is pinned into bracket 88 and frame 12 as shown. Right side drive wheel 16 and right rear castor 20 are then raised to lower the right side of frame 12 onto towing wheel assemblies 80a and 80b. As shown in FIG. 2, fifth-wheel assembly 90 is an articulated, hinged frame assembly which is normally stored in a retracted position, and which is extended and locked into position as shown in FIG. 7 for being hooked to a truck (not shown) for towing apparatus 10. Fifth-wheel assembly 90 may be raised and lowered by any suitable winch assembly 92 (FIG. 6). Apparatus 10 thus configured may be conveniently towed over public roads with considerably less expenditure of time, effort and expense when compared to prior art apparatus. Towing the composter is further accommodated by the novel frame design of the present invention in which drum 56 serves as a tension member interconnecting vertical subframes 12a and 12b as discussed above. The use of drum 56 as a tension member in frame 12 eliminates the need for additional structural members to resist spreading forces exerted on subframes 12a and 12b during operation and towing. Frame 12 can therefore be designed with a lower overall height to accommodate passage beneath lower bridges and overpasses. Upon arriving at its destination, towing wheel assemblies 80a and 80b are removed and apparatus is reconfigured for operation by reversing the above procedure. In the alternative embodiment, wheel assembly 81 is retracted by operation of hydraulic cylinder 83.

Prior art apparatus have proven generally unsatisfactory for processing such contaminated material due to their inability to effect adequate aeration of the materials to ensure aerobic conditions throughout the material, and due to their inability to effect adequate removal of excess moisture from the material when required. Applicants have discovered a solution to these problems in the form of the present invention wherein a novel drum and paddle assembly 22 is rotated at high speed in a direction opposite to that of prior art apparatus. In addition to directly impacting the contaminated material for shredding it, the rotating drum assembly 22 also draws air from ahead of the apparatus into chamber 24 and generates a high-speed stream of air in chamber 24. The high speed air stream entrains the contaminated materials and circulates them in overlapping, counter-rotating circular patterns within chamber 24 for thoroughly aerating and mixing them. The entrained materials are suspended and circulated in the air streams, and then redeposited in a windrow to the rear of the rotating drum. As a further advantage, after mixing and aerating the contaminated materials as described, the present invention redeposits the materials in a relatively tall, more squared-off windrow having a higher volume of materials per unit of surface area than known apparatus.

To begin a contaminated materialing operation, engine 38 is started, and drum drive motors 48a and 48b are engaged to counter-rotate drum assembly 22, preferably at approximately 550 RPMs. Apparatus 10 is now raised or lowered to a desired ground clearance by activation of hydraulic cylinders 43. By so doing, apparatus 10 can be adjusted to process more or less material. This unique ability of the present invention allows for a more efficient contaminated materialing operation by permitting greater volumes of material to be formed into a single windrow and processed in a single pass, resulting in more efficient use of the available ground area, and less processing time for a given amount of material. The height adjusting ability is additionally useful in that as the contaminated materialing process partially decomposes the windrow of material, the volume of material decreases. The present invention allows the operator to readily adjust for the volume decrease without any decrease in the effectiveness of mixing and aeration.

Having selected the appropriate height, the Operator now drives apparatus 10 forward to engage the contaminated material. As the apparatus engages and proceeds along the windrow, the contaminated material is mixed and aerated by the action of the counter-rotating drum assembly. We define counter-rotation to mean rotation in a counterclockwise direction when viewed from the right end of the drum assembly, or stated slightly differently, in the opposite direction of rotation of forward rolling drive wheels 14 and 16. Counter-rotating drum assembly draws air into chamber 24 from ahead of the apparatus in the form of an upwardly and rearwardly directed air stream ahead of the drum assembly, providing significant advantages as will be further explained. As apparatus 10 approaches, the upwardly flowing air stream first engages the windrow ahead of the drum assembly and entrains a portion of the material which travels in the air stream and which does not directly engage the counter-rotating drum assembly. Counter-rotating drum assembly 22 then engages the remaining material which is deflected by deflector plate 71 toward cutting edge 72, where the material is microenfractionated, and then entrained in the air stream. While the precise amounts of material are microenfractionated in each pass of the apparatus are not known with certainty, in the processing of grass straw, for example, 3–4 passes through the contaminated material will normally produce a thoroughly microenfractionated contaminated material.

Under certain operating conditions, particularly when processing heavier materials, drum 30 can be slowed and even stalled. Owing to the hydraulic coupling between the drum and engine, stalling of the drum can stall the engine as well. In the preferred embodiment, this problem is addressed by monitoring the engine speed to detect slowing of the drum, and reducing power to the drive wheels when slowing of the drum is detected. Reducing power to the drive wheels slows the forward progress of the composter through the windrow, thereby reducing the load on the drum and allowing it to resume its normal operating speed. In the preferred embodiment, the power to the drive wheels is first reduced by to 50% or normal, and if after no more than a few seconds the drum has not resumed its normal operating speed, further reducing power to the drive wheels to 30% of normal. Once the drum has resumed normal operating speed, the power to the drive wheels is increased to its normal level. In order to avoid lurching and resultant damage to the drive mechanism, applicants have found that the power to the drive wheels must be resumed gradually rather than all at once.

Reducing and increasing the power to the drive wheels in response to changes in the drum speed is achieved by means of electrical control of the hydraulic pumps which provide pressurized hydraulic fluid to the left and right drive wheel hydraulic motors 42a and 42b respectively. A schematic diagram of the control system is shown in FIG. 16. A manually operated speed controller is provided for each of the two drive wheels. During normal operation, speed controllers 104a and 104b electrically control the output of hydraulic pumps 40a and 40b responsive to movement of the speed controllers by the operator. When drum 30 (not shown in FIG. 16) slows, a corresponding slowing of alternator 102 triggers a signal to controller 100, a Sundstrand Mod.MCH22BL1844. In response, controller 100 reduces the voltage applied to speed controllers 104a and 104b by 50%, which reduces the power to left and right drive wheel hydraulic motors 50a and 50b respectively by a corresponding amount. If within two seconds drum 30 has not resumed its normal operating speed, controller 100 further reduces the voltage to speed controllers 104a and 104b to 30% of normal. In applicants' experience reduction of power to the drive wheels to 30% of normal has been sufficient to overcome all but the most severe stalling conditions.

Once drum 30 has resumed its normal operating speed, controller 100 restores normal voltage to speed controllers 104a and 104b and normal operation is resumed. Applicants have found that the control system as described is so responsive that it is necessary to resume normal power to the drive wheels gradually in order to avoid lurching of the composter and damage to the drive train. To that end, once the drum has resumed normal operating speed controller 100 increases the voltage to speed controllers 104a and 104b gradually over several seconds.

The entrained microenfractionated contaminated material is propelled upwardly and rearwardly in a pair of generally rotating vortex-like airstreams. Each airstream rotates generally upwardly and outwardly from the center of the drum, and spirals toward the rear of chamber 24. The airstreams overlap at their inner portions, providing repeated exchange of entrained material therebetween. As the air streams begin to lose their velocity, the microenfractionated contaminated material begins to drop out of the air stream and is redeposited into a windrow. Applicants have discovered for the first time that this method of microenfractionation solves the aforementioned shortcomings of prior art apparatus; namely, that is that the relatively light wastes of this nature can be sufficiently aerated, mixed and dried as necessary by being entrained in and contacted with a relatively large volume air drawn into a mixing chamber by a drum and paddle design according to the present invention.

The airstreams are generated according to the preferred embodiment by the left, right and center paddles previously described. As best seen in FIG. 9 and 14, each row of paddles according to the present invention includes a group of paddles having paddle portions 76 facing toward opposite ends of the drum. As the drum is rotated, each paddle portion 76 draws air into chamber 24 and generates a series of airstreams flowing in the direction of the drum rotation and laterally outwardly toward the end of the drum. The series of airstreams generated by the two group of similarly oriented paddle portions 76 combine to form a pair of oppositely rotating airstreams, each of which is rotating outwardly and spiralling rearwardly within chamber 24. The interspersing of paddles having opposite facing paddle portions 76 near the center of the drum creates a region in which the oppositely rotating airstreams overlap. In the overlapping region, contaminated material is continuously exchanged between the airstreams, providing more thorough mixing of the contaminated materials than has heretofore been possible. The microenfractionated contaminated materials remain entrained in the airstreams for a relatively long time, until the air stream slows sufficiently to cause the material to fall from the airstream. In this way, the contaminated material is afforded an extended contact time for aeration and drying. As the airstreams spiral rearward, they exit chamber 24 through rear opening 27 and rear tail portion 31. Rear drapes 35 serve to limit the rearward travel of the airstreams and any entrained or thrown contaminated materials. Applicants have discovered that the microenfractionation of the present invention is significantly enhanced by the use of tail section 31, which apparently serves to promote the formation and rearward extension of the rotating airstreams, extending the contact time between the air and contaminated materials. The ability of the present invention to provide extended, intersticial aeration of relatively light contaminated materials has not been possible with prior art apparatus, and represents a significant advance in the art.

A further benefit of the present invention over prior art apparatus is related to the large volume of fresh air which is continually drawn into chamber 24 and into intimate contact with the contaminated material. This feature is also of significant benefit when heavier materials which may not be readily entrained in the airstream, and which are mixed primarily by being thrown upwardly and rearwardly due to contact with paddle portions 76. Even so, with the large amount of air drawn into chamber 24 in the form of high-speed air streams, these microenfractionated materials are contacted with significantly more air under more effective aerating conditions than is possible with known apparatus.

BIOREMEDIATION OF ALIPHATIC, POLYCYCLIC, AROMATIC & HETEROCYCLIC HYDROCARBON COMPOUNDS & CHLORINATED COUNTERPARTS THEREOF

Aliphatic, polycylclic, aromatic, and heterocyclic hydrocarbon compounds, and their chlorinated counterparts, are well known soil and water pollutants. Creosote and pentachlorophenol, for example, are generally associated with surface soils, water in treatment lagoons or evaporation areas, and ground water contaminated with leachate from the above sources. Almost all of these compounds are associated with wood treatment facilities. Bioremediation, the use of pollutant-degrading microorganisms to ameliorate contaminated materials, represents one means by which these sites may be restored to their original condition.

The ability of bacteria to break down compounds that are difficult to degrade is a function of their metabolic activities or pathways. Microbial strains possess complex biochemical pathways that allow them to use synthesized organic compounds. But when aromatic organic compounds undergo substitution with chlorine atoms, the compounds become very difficult to degrade. However, if the compounds are completely metabolized by microbial strains, usually only carbon dioxide, water, and chlorine are the end products.

For a compound to be degraded biologically under field conditions, several basic criteria must be met:

(1) An appropriate microbial community possessing the requisite catabolic ability must be present (exposure to the chemical contaminant), (2) Bioavailability of the substrate along with the organism-substrate interaction.

(3) Environmental parameters such as temperature, redox potential, oxygen and nutrient availability, and moisture must be conducive to growth of organisms.

Growth of microorganisms at the expense of the phenol and methyl-phenol (cresol) components of wood treating compounds will result in the proliferation of a diverse microbial population employing a variety of degradative pathways. Because of the convergent nature of pathways of aromatic metabolism, development of a large and diverse microbial population proficient in degrading phenolic compounds will furnish the requisite pathways for the later steps of degradation of PAH's, heterocyclic compounds and chlorinated aromatic compounds. Hence, PAH's and chlorinated organic compound degradation is greatly enhanced by simultaneous cresol degradation.

Various methods have been developed for increasing the rate of degradation, such as mixing, nutrients, etc. Since most environments have an indigenous population of oil degrading microorganisms that can multiply rapidly under appropriate conditions, addition of seed bacteria and/or seed fungii is usually of little value in stimulating cleanup.

TESTING SEQUENCE

Testing procedures will vary depending on the regulatory agencies and site location, but under typical conditions a complete analysis for contamination should be made on site opening and site closings. Control test analysis should be limited to those contaminants that produce diverse microbial population (cresol/phenol), and those contaminants that are slow degraders (phenanthrene/PCP) and fast degraders (naphthalene). This will allow the operator to determine the rate of total degradation of all compounds, at reasonable cost control criteria.

TOTAL TESTING PROCEDURES

The following is a list of various contaminates associated with creosote and pentachlorophenol. Coal tar creosote is composed of approximately 85% polycyclic aromatic hydrocarbons (PAH's); 10% phenolic compounds; and 5% N—S—O Heterocyclics. The following lists will cover an estimated 95% of the total creosote and include some of the more toxic chemicals present.

Polycyclic aromatic hydrocarbons such as naphthalene, 2-methylnaphthalene, phenanthrene, anthracene, 1-methylnaphthalene, biphenyl, fluorene, 2,3-dimethylnaphthalene, 2,6-dimethylnaphthalene, acenaphthene, fluoranthene, chrysene, pyrene anthraquinone, 2-methylanthracene, 2,3-benzofluorene, and benzopyrene; phenolic compounds such as phenol, o-cresol, m-Cresol, p-Cresol, pentacholorophenol, 2,5-xylenol, 3,5-xylenol, 2,3-xylenol. 2,4-xylenol, 2,6-xylenol, 3,4-xylenol, and 2,3,5 trimethylophenol; heterocyclic compounds such as H-heterocyclics, S-heterocylics, quinoline, isoquinoline, carbozole, 2,4-dimethyl-phyridine, acridine, aniline, 2-methylquinoline, 4-methylquinoline, pyrrole, pyrrolidine, benzothiophene, dibenzothiophene; and O-heterocyclics such as dibenzofuran.

HALOGENATED HYDROCARBONS

Pentachlorophenol solutions, which are the most well known halogenated hydrocarbon continants, are composed of a 5% mixture of pentachlorophenol in either heavy fuel oil or light mineral oils, and they are sometimes used in conjunction with various metal naphthenates such as copper and zinc naphthenates and tetrachlorophenol. Other halogenated hydrocarbons include chlorinated aromatics such as chlorobenzene, 1,2-dichlorobenzene, 1,3-dichlorobenzene, 1,4-dichlorobenzene, and 1,2,4-trichlorobenzene, and halogenated aliphatics such as chloroform, carbon tetrachloride, 1,2-dichloroethane, 1,1,1-trichloroethane, 1,1,2,2-tetrachloroethane, tetrachloroethylene, bromodichloromethane, dibromchloromethane, bromoform, and 1,2-dibromoethane.

Aerobic reactions are employed in accelerated bioremediation of the treated contaminated material of the present invention as previously and as subsequently discussed. However, in the case of bioremediation of halogenated hydrocarbons, methanogenic reactions are employed either alone or in combination with aerobic reactions. Aerobic reactions contemplate the use of oxygen and microenfractionation as the driving forces. Methanogenic reactions are endothermically driven reactions conducted without stirring and in the absence of oxygen. These reactions can be conducted in sequence whereby the first step comprises $O_2$-supplying amendments and microenfraction, followed by a second step in which anaerobic amendments are added and the reaction is allowed to proceed endothermically.

MUNITIONS, EXPLOSIVES, PROPELLANTS & PYROTECHNICS

The treated contaminated material can be contaminated with other toxic material, such as the toxic materials in munitions, explosives, propellants, rocket fuel and pyrotechnic materials. These toxic materials typically can include aromatic hydrocarbon materials including trinitrotoluene which is a hydrazine compound.

SOIL CONSISTENCY MICRO/MACRO ORGANISMS & PLANTS

The soil environment differs from one geographic location to another, and so the degradation of compounds in the soil varies in different locations. Bacterial metabolism of these compounds is affected by such soil factors as pH, temperature, oxygen content, nutrients, and depth. Typically, degradative microbes in the soil require a near-neutral pH, a temperature of 77–82 degrees F. and available free oxygen, since many of the enzymes involved in metabolic degradation are oxidative.

The degradation of the petroleum hydrocarbons, and therefore, soil recovery time, appears to be influenced by such factors as the particular fraction of hydrocarbon spilled, the soil type, and the climate. Understanding these environmental factors gives insight into the distribution of microorganisms and their function in filling ecological niches, which are essential for supporting productivity and maintaining environmental quality of ecosystems.

Commensal relationships, synergism, enables microbial populations to reach higher densities in the rhizosphere (soil influenced by plant roots) than in root free soil, and plants exhibit enhanced growth characteristics as a result of interactions with rhizophere microbes. Mutualism relationships lead to evolution of new organisms and on up the food chain producing a balanced eco system and food web.

In order to achieve this balance ecosystem and therefore, provide the best possible food web, an optimum physical environment must be effected for the soil medium.

SOILS

Soil temperature depends upon absorption of solar radiation, reradiation from the surface, conductive and exchange with the air, heat flow within, and the heat capacity of the soil. Soil color an surface texture influence both absorption and reradiation. Organic residues on the soil surface tend to warm faster an display a major role in soil temperature, by interception of incoming and outgoing radiation and reduction in velocity of air movement at the soil surface. Water contact is also a major factor in both heat transfer and heat retention. Changes in soil water content involves significant quantities of energy or latent heat. All of the above affect the temperature of soil which is so important for an optimum physical environment for microbes to plants.

Since the growth of plants, microorganisms, etc, require optimum physical environment, the presence of organic materials profoundly affect these properties. The humus acts as binding agents imparting stability to mineral particle arrangements of soil aggregates. Soils supporting growing plants and organisms must have a matrix-plus-osmotic potential ranging from −15 bars up to a fraction of −1 bar. If the soil is too wet, aeration becomes limiting. Soils with mostly fine pores tend to remain wet and to warm slowly. By adding compost to fine pore soils, both aeration and drying of soils is enhanced.

By affecting a balanced program of soil preparation, nutrient addition and aeration designed for optimum plant growth, microorganisms will also be under optimum condition to proliferate and degrade almost all of the present hydrocarbon based contaminates that abound in our environment. Soil degradation of organics produces gaseous carbon dioxide. It is desirable to remove as much of the carbon dioxide in the soil as possible. Carbon dioxide can be released through the permeable soil through the use of the method of the present invention. Once the carbon dioxide is purged from the soil, plants can intake the carbon dioxide and metabolize same to oxygen. Oxygen is released in the area surrounding the plants and is effectively used in the subject bioremediation of treated contaminated material.

PHYTO-REMEDIATION

Bioremediation is typically the removal of soil contaminants such as creosote, PCP's and PAH's which facilitates the detoxification of the contaminated soil, using indigenous microbial populations. In phyto-remediation, which is a form of bioremediation, appropriate plant species are selected for independent removal of metals, particularly heavy metals, from contaminated material such as soil. "Accelerated" phyto-remediation comprises phyto-remediation which further employs the above-described principles of accelerated bioremediation to remove metals from contaminated material using plant species introduced into the microenfractioned treated contaminated material. The metals in the microenfractioned treated contaminated material pass into the intertices of these plants by hyperaccumulation during the course of the growing process.

An example of accelerated phyto-remediation is the use of Anthoxanthum as the plant species in the removal of heavy metals such as zinc, lead, copper, chromium, mercury, nickel, cadmium, arsenic, barium, and selenium, from microenfractioned treated contaminated soil. Other plant species which can used in accelerated phyto-remediation include Deschampsia (lead), *Gremnaina doniana* (lead), *Stereochleuena cameronii* (lead and copper), *Festuca ovina* (lead), and *Ambrosia artemisfolia* (lead, zinc and copper).

After the plant species have been grown it is harvested. Harvesting of the plant species typically includes recovering at least some of the hyperaccumulated metal by removing at least a substantial portion of the metal from the metal-contaminated soil. More specifically, it is preferred that after the plant species including the hyperaccumulated metal have been harvested, that certain portions of the phyto-remediation process are repeated such as repeating the steps of introducing into the microenfractionated treated contaminated material additional plant species capable of removing metals therefrom, and harvesting the additional plant species including hyperaccumulated metal. The steps in the phyto-remediation sequence are generally repeated until the amount of metal remaining in the treated contaminated material does not exceed a predetermined level, such as the requisite governmental standards. In each of the treatment sequences it is preferred that the soil be renutrified and reseeded in order to maximize the effect of micoenfractionation. Thus, in many instances, the amount of metal remaining in the treated contaminated material can be reduced so that it is not greater than 5 ppm.

Preferably, after the plant species including hyperaccumulated metal have been harvested, certain further steps are taken. These step can include incinerating the harvested plant species to produce an incinerated material, collecting the incinerated material, and disposing of the incinerated material.

Another method of remediating metals involves microenfractionating the metal-contaminated material and fixation of metals therein. In addition to providing an entraining air stream having a sufficient velocity for entraining the contaminated material therein, entraining the contaminated material in the air stream, microenfractionating the contaminated material, and discharging the microenfractionated contaminated material from the air stream into the surrounding environment. The metals are then fixated in the microenfractionated contaminated material so that the metals are substantially prevented from leaching into the surrounding environment. The fixating of the metals can occur by physically combining the microenfractionated contaminated material with a material which prevents leaching of the metals into the surrounding environment. For example, the fixating of the metals can comprise physically combining the microenfractionated contaminated material with a coating material by coating thereof which prevents leaching of the metals into the surrounding environment. Typically, the coating material comprises Portland cement, and preferably the coating material further includes wood fly ash. Fixating of the metals can also comprise chemically treating the metals to produce metal compounds which will not leach into the surrounding environment. For example, chemical fixation of the metals can comprise chemically treating the metals by oxidizing the metals to produce metal oxides which will not leach into the surrounding environment.

In the phyto-remediation process of this invention, the soil to be remediated is first treated with chemical and/or biological amendments for degradation of contaminants therein, such as an appropriate nutrient formula chosen for metal removal based on the specific plants employed. For instance, for broad leaf or grass plant species, a nutrient formula is first determined by conducting a soil analysis. Soil analysis determines the NPK and micro-nutrient formulas. The nutrient formulas are dependent upon whether the plants being used in the accelerated phyto-remediation process are broad leaf or grass plant species.

The contaminated soil treated with the nutrient formula is subjected to microenfractionation, in the manner provided above which includes the steps of providing an entraining air stream having a sufficient velocity for entraining the treated contaminated material therein, entraining the treated contaminated material in the air stream, microenfractionating the treated contaminated material, discharging the microenfractionated treated contaminated material from the air stream, introducing into the microenfractionated treated contaminated material biological amendments for facilitating accelerated phyto-remediation thereof, introducing into the microenfractionated treated contaminated material plant species capable of removing metals therefrom, and acceleratedly phyto-remediating the treated contaminated material. In the case of hyperaccumulating, for example, metal in the soil is removed therefrom into the intertices of the plant species during growing thereof thereby removing at least a substantial portion of said metal from the metal-contaminated soil.

The plant species including the hyperaccumulated contaminants are then harvested. After harvesting, the steps of introducing into the microenfractionated treated contaminated material additional plant species capable of removing contaminants therefrom, and harvesting the additional plant species including hyperaccumulated contaminants, are repeated until the amount of contaminants remaining in the treated contaminated material does not exceed the requisite governmental standards. After the plant species including hyperaccumulated contaminants have been harvested, the steps of incinerating the harvested plant species to produce an incinerated material, collecting the incinerated material, and disposing of the incinerated material.

Accelerated phto-remediation is typically accomplished in a multi-step microenfactionation process. Thereafter, windrows of the microenfractionated material are formed to facilitate the phyto-remediation process. The windrows are then seeded with the appropriate first growth plant for producing a selected species. Moisture level are maintained for proper plant growth. Typically, soil analysis is conducted to determine the water holding capacity of the soil. This will establish the amount of water that can be retained by the soil. The water can be applied to the soil by sprinkling application.

During the summer or warmer months of the year, the windrows can be left uncovered. However, during the winter or colder months, the windrows should be covered by portable greenhouses. This is typically accomplished by covering the windrow with Loretex 1212 UV (½ circle size preferably 18" wide by 8' tall) which is made to order depending on the individual windrow dimensions.

The seeding rate is preferably at least two times the recommended rate. For example, for *Ambrosia artemisfolia,* this means about 60,000 per acre. As for the nutrients, they are generally added on a 21 day cycle.

When the first growth plants have grown to a predetermined size, they are harvested with a machine or device, such as a sickle blade mower, which is capable of severing substantially the entire plant in a manner which will allow it to remain intact. The crop of plants harvested is then incinerated in a closed incinerator and the resultant ash produced thereby is accumulated a disposed of, typically in a land fill.

A second growth of the selected plants is then produced at a height of about 18 inches. The above-described first method for growing, harvesting and disposing of the selected plants is repeated, and soil resampled for heavy metal content. A this time it can be determined whether or not to change the plant species previously selected.

Subsequent planting should wait for a period of about two weeks. In any case, the above procedure should be repeated until the amount of heavy metal contaminants in the soil does not exceed governmental (EPA, etc.) standards.

In a further method of removing contaminants from contaminated material, the microenfractionated treated contaminated material is discharged from the air stream using the process described above. Then, biological amendments are introduced into the microenfractionated treated contaminated material for facilitating accelerated phyto-remediation thereof along with plant species capable of removing contaminants therefrom. The treated contaminated material is then acceleratedly phyto-remediated by hyperaccumulating the contaminants therefrom into the intertices of the plant species during growing thereof. In this way, at least a substantial portion of the contaminants from the contaminated soil are removed. The contaminants can comprise a radioactive material in general, and more particularly it can comprise any one of fission radioactive products and activation products from nuclear reactors, fuel element dissolution radioactive products, and naturally occurring radioactive products. The fission products from nuclear reactors can preferably comprise any one of Cs-137, Sr-89, Sr-90, I-129, Ru-103, Ru-106, Zr-95, Nb-95, Ce-141, Ce-144, H-3, and Tc-99. Moreover, the activation products from nuclear reactors can comprise any one of Pu-239, Pu-240, Pu-241, Am-241, Co-60, Na-55a, Mn-54, and Hg-203. As for the fuel element dissolution radioactive products, they typically comprise U-238. Finally, as for the naturally occurring radioactive products, they can be any one of Cm-244, C-14, and Th-232.

EXAMPLE 1

This example demonstrates the effect of accelerated bioremediation when the method of the present invention is employed using an HH System 614 Turborator microenfractionation apparatus.

| Contaminant: #2 Heating Oil Sampling Results: | |
| --- | --- |
| Starting Sample | |
| Site UB 1-7-9 | 2,400 ppm |
| Ambient Air Temp | 1.4° C. |
| Pile Temp, Sit UB 1-7-9 | 18.3° C. |
| First Sampling (55 days later) | |
| Site UB 1-7-9 | 110 ppm |
| Ambient Air Temp | 0.6° C. |
| Pile Temp, Site UB 1-7-9 | 13.7° C. |

Procedure Used:

1. Soil sample for this site was measured for pH physical parameters/soil moisture retention, water content and bulk density.

a. Physical soil parameters/grain size distribution.

b. Nutrient and micronutrient content.

2. Site was then windrowed and most of the large rocks were removed.

a. Windrow was laid out 4.2 meters wide and 1 meter to 1.8 meters high.

b. The site contained about 230 cubic meters of contaminated soil.

c. 30 cubic meters of alder sawdust was added to the 230 cubic meter pile.

3. The pile was then sprayed with a combination of HH MICRO-2, HH MICRO-51D, SIMPLE GREEN, AGRI-SC and water. SIMPLE GREEN, which is manufactured by Sunshine Maker's, Inc. of Huntington Harbour, Calif., is a trademarked proprietary surfactant which acts as a degreaser and industrial cleaner which is water soluble and comprises a gylcol ether, i.e, it contains up to 6% of 2-butoxyethanol (Butyl Cellosolve) and has a nutrient content of <1.0% nitrogen by weight, 0.3% by formula of phosphorus, and 0.6% by weight of sulfur. AGRI-SC is a tradmarked ionic surfactant (a sodium lauryl sulfate derivative) marketed by Four Star Agricultural Services, Inc. of Bluffton, Ind., which functions as a soil change potential modifier. After application of nutrients and chemicals using a spray system such as the H & H System T spray, then the microenfractionation apparatus can start its work.

4. The pile was then microenfractionated with the HH SYSTEM 614 Turborator two times.

5. Then the pile was covered with clear plastic.

The soil at the site was extremely difficult to work with. It had a clay content of 27% and a silt content of 36% giving it an "almost fatty clay" description with 63% fines.

Alder sawdust with a particle size of 0.5 cm. in diameter was mixed into the soil. This allowed the oxygen to become encapsulated into the treatment pile. The HH SYSTEM 614 Turborator not only intermixed the sawdust almost completely, but it also forced oxygen into the pile and encapsulated it in the treatment site.

This example demonstrates that the method of the present invention, and the method of using the subject apparatus, reduced the hydrocarbon contaminant level (#2 heating oil) in the contaminated material by 92.7% in 55 days at ambient temperature conditions of slightly above freezing.

EXAMPLE 2

The method of EXAMPLE 1 was repeated at the same location but at a different site. The conditions under which the test was conducted were as follows:

| Contaminant: #2 Heating Oil Sampling Results: | |
| --- | --- |
| Starting Sample | |
| Site B-2 | 2,400 ppm |
| Ambient Air Temp | 1.4° C. |
| Pile Temp, Site B-2 | 12.8° C. |
| First Sampling (56 days) | |
| Site B-2 | 53 ppm |
| Ambient Air Temp | 0.6° C. |
| Pile Temp, Site B-2 | 7.9° C. |

This example demonstrates that the method of the present invention, and the method of using the subject apparatus, reduced the hydrocarbon contaminant level in the contaminated material at a second site at the same location by 97.8% in 56 days at ambient temperature conditions of slightly above freezing.

EXAMPLE 3

| | |
| --- | --- |
| Contaminant: | #2 Heating Oil at Low Levels |
| Starting Date: | December 1, 1992 |

Description:

The contaminant on this site was #2 heating oil at low levels—i.e., less than 2,000 ppm average. The soil type was silt mixed with clay. Two separate dirt piles of approximately 300 cubic yards each represent the material to be treated.

Procedure Used:

The treatment regiment for both sites was the same with one exception. The dirt pile in the lower parking lot had an additional amendment added.

Because of the dense nature of the soil, wood sawdust (non cedar) were added to the contaminated soil as a bulking agent to allow air pockets for the required oxygen the bacteria need for aerobic digestion of the hydrocarbons.

Ideally, the underliner would have been installed first, then wood chips distributed and compacted to 18" in depth uniformly over the liner. Next, the soil would be installed on top of the wood chips. In this case however, the soil was already installed on the underliner, hence the wood chips were applied to the top of the soil pile. After this step, the nutrient/surfactant application commenced. This was facilitated by the use of a spray boom using agricultural components to achieve even distribution over the soil pile. A combination of HH MICRO-51D, HH MICRO-2D, Simple Green and Potassium Hydroxide for pH neutralization were specified for this biological degradation.

Mixing of the soil piles was accomplished by utilizing the HH SYSTEM 614 Turborator soils mixer. Two passes through the soil pile were required to adequately mix the nutrients and wood chips into the soil.

Weather conditions during treatment were cold −4° to 0° C. Ordinarily, these low temperatures are not conducive to biological treatment of soils. However, at twenty-four hours past treatment, temperatures as high as 26° C. were recorded within the soil piles. This rapid rise in soil temperature is most likely to increase biological activity in soil piles. NOTE: Soil piles were covered with clear visqueen. Loretex 1212 UV is ordinarily recommended for this purpose.

By utilizing the HH SYSTEM 614 Turborator for soil homogenization, the soil piles can be significantly larger than ordinary land farm programs. The soil pile profile can be 14 ft. wide at the base, 5 ft. wide at the top, 6.5 ft. high. Length is determined by the quantity of soil or space constraints at the site. The HH SYSTEM 614 Turborator homogenizes the soil extremely well while also aerating the pile with fresh air and purging $CO_2$ from the soil.

The combination of H&H nutrients, Simple Green and SYSTEM 614 greatly enhance the speed of biological degradation. These soils piles were being land farmed by conventional methods for several months prior to the H&H Eco Systems' treatment and only showed a hydrocarbon reduction of approximately 2%.

This example demonstrates that the method of the present invention, and the method of using the subject apparatus, reduced the hydrocarbon contaminant level of the hydrocarbon material (heating oil) in the contaminated material by 94.5% in 55 days during winter weather and temperatures in the months of December and January.

EXAMPLE 4

This example demonstrates the effect of accelerated bioremediation on a particularly difficult hydrocarbon contaminant (used motor oil) when the method of the present invention is employed using an HH System 614 Turborator microenfractionation apparatus.

| Contaminate: Used Motor Oil Sampling Results: | |
|---|---|
| First Sampling: | |
| TPH level: | 35,000 ppm TPH |
| Second Sampling (32 days later): | |
| TPH level: | 13,000 ppm TPH |
| Ambient Air Temperature: | 1.6° C. |
| Pile Temperature: | 24.4° C. |
| Third Sampling Date (68 days later): | |
| TPH level: | 880 ppm TPH |
| Ambient Air Temperature: | 1.6° C. |
| Pile Temperature: | 15.5° C. |

Procedure Used:
  a. Site was lined with NOVA-THENE® RB616-6HD.
  b. The liner was then covered with an 8×14 ft. wide pile of contaminated soil.
  c. A layer of alder dust 18" in depth (compacted) was added to the pile.
  d. Contaminated soil was then placed in a windrow 14 ft. wide and 5–6 ft. high
  e. Site was then sprayed with the following:
    150 L. HH MICRO-51
    100 L. HH MICRO-2
    51 L. Simple Green
    457 L. Water
  f. Pile was then microenfractionated twice using an HH SYSTEM 614 Turborator.
  g. Pile was then covered with Loretex 1212 UV to allow solar radiation rays to penetrate.
  h. Pile was left untouched for 32 days at which time the following was done:
    The cover was removed
    The site was again sprayed with
      150 L. HH MICRO-51D
      100 L. HH MICRO-2
      51 L. Simple Green
      457 L. Water Again, the pile was microenfractionated twice with HH SYSTEM 614
Pile was recovered with Loretex 1212 UV.
  i. Pile was left untouched for an additional 36 days at which time the following was done:
    The cover was removed
    The site was sprayed with
      150 L. HH MICRO-51D
      51 L. Simple Green
      557 L. Water
    The pile was microenfractionated twice with HH SYSTEM 614.
  j. Pile was recovered with Lortex 1212 UV This example demonstrates that the method of the present invention, and the method of using the subject apparatus, reduced the hydrocarbon contaminant level of a difficult-to-bioremeditate hydrocarbon material (used motor oil) in the contaminated material by 97.5% in 68 days at ambient temperature conditions of slightly above freezing.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

We claim:

1. A method of using an apparatus in the accelerated bioremediation of a hydrocarbon-containing contaminated material which has been combined with chemical and/or biological amendments to form a treated hydrocarbon-containing contaminated material, the method comprising the steps of generating an air stream at a velocity sufficient for entraining the treated hydrocarbon-containing contaminated material therein, entraining the treated hydrocarbon-containing contaminated material in said air stream, and microenfractionating the treated hydrocarbon-containing contaminated material under conditions sufficient to form a microenfractionated treated hydrocarbon-containing contaminated material thereby facilitating subsequent accelerated bioremediation under conditions sufficient for conducting said accelerated bioremediation.

2. The method of claim 1, wherein the treated hydrocarbon-containing contaminated material comprises a hydrocarbon-containing material selected from a group consisting of a polycyclic and chlorinated polycyclic, an aromatic and chloroaromatic compound, a heterocyclic and chlorinated heterocyclic compound, and an aliphatic and a chloroaliphatic compound.

3. The method of claim 1, wherein the hydrocarbon-containing material selected from a group consisting of phenol, cresol, pentachlorophenol, phenanthrene and naphthalene.

4. The method of claim 1, wherein the accelerated bioremediation is conducted aerobically or methanogenically.

5. The method of claim 1, which further includes the step of, after microenfractionating the treated contaminated material to form a microenfractionated treated hydrocarbon-containing contaminated material, locating a cover over the microenfractionated treated hydrocarbon-containing contaminated material, the cover allowing substantial solar radiation to pass therethrough and into the microenfractionated treated hydrocarbon-containing contaminated material, thereby facilitating the accelerated bioremediation and preventing moisture from soaking the microenfractionated treated hydrocarbon-containing contaminated material.

6. The method of claim 1, wherein a treated hydrocarbon-containing contaminated material entraining air stream is generated by the apparatus which comprises an elongate drum having a longitudinal axis, first and second end portions, and a center portion, the drum being rotatable about its longitudinal axis at a rotational speed, and means extending outwardly from the drum for generating the treated hydrocarbon-containing contaminated material entraining air stream.

7. The method of claim 6, wherein the treated hydrocarbon-containing contaminated material entraining air stream comprises a plurality of air currents, and wherein the means extending outwardly comprises an air current generating means comprising a plurality of paddles extending outwardly from a cylindrical outer surface of the drum.

8. The method of claim 7, wherein each paddle comprises a base portion connected to the drum, and a blade portion, each blade portion having a major surface oriented for generating at least one air current having a sufficient velocity for entraining and transporting the treated hydrocarbon-containing contaminated material upwardly of the rotating drum when a drum is rotated at a rotational velocity.

9. The method of claim 1, wherein the treated contaminated material entraining air stream comprises a plurality of intersecting air currents, each of the intersecting air currents having a sufficient velocity for entraining and transporting a portion of the treated contaminated material upwardly of the apparatus.

10. The method of claim 9, wherein the apparatus used for generating a plurality of intersecting air currents is provided which comprises:

a plurality of end paddles extending radially outwardly from first and second end portions of a drum, each of the end paddle comprising a base portion connected to the drum and a blade portion, the blade portion having a major surface oriented relative to the drum for generating an air current directed upwardly of the drum and transversely toward the center portion of the drum when the drum is rotated at a rotational speed;

a plurality of center paddles extending radially outwardly from the center portion of the cylindrical outer surface, each of the center paddle comprising a base portion connected to the drum, and a blade portion having first and second major surfaces, the first and second major surfaces oriented relative to the drum for generating an air current directed upwardly and rearwardly of, and transversely toward the first and second end portions of the drum respectively when the drum is rotated at the rotational speed; and the air currents generated by the end and center paddles intersecting and combining to form the treated hydrocarbon-containing contaminated material entraining air stream for microenfractionating and homogenizing and aerating the treated hydrocarbon-containing contaminated material.

11. The method of claim 1, wherein the treated contaminated material entraining air stream comprises a vortex-type air stream which transports the entrained treated contaminated material in a generally circular path.

12. The method of claim 10, wherein the end and center paddles extend radially outwardly from the drum and are arranged in a plurality of helical longitudinal rows.

13. The method of claim 7, wherein the drum further comprises first and second transition portions disposed between the center portion and the first and second end portions respectively, the first and second transition portions of the drums having a plurality of end paddles and a plurality of center paddles extending radially outwardly therefrom.

14. The method of claim 1, wherein at least about 70% of a total amount of hydrocarbon material in the treated hydrocarbon-containing contaminated material is remediated within 120 days of treating the treated hydrocarbon-containing contaminated material with the chemical and/or biological amendments.

15. The method of claim 1, wherein the micro-enfractionating step further comprises homogenizing and aerating the treated contaminated material.

16. The method of claim 1, wherein the step of microenfractionating the treated hydrocarbon-containing contaminated non-microenfractionated material increases the surface area of said treated hydrocarbon-containing contaminated non-microenfractionated material, as compared to the surface area of the treated hydrocarbon-containing contaminated non-microenfractionated material, by a factor of at least about $1 \times 10^6$.

17. The method of claim 1, which further includes the step of discharging the microenfractionated treated contaminated material from the air stream and redistributing it throughout a soil matrix thereby substantially increasing the surface area of the microenfractionated treated contaminated material.

18. The method of claim 17, which further includes the step of dispersing further chemical and/or biological amendments throughout the redistributed microenfractionated treated hydrocarbon-containing contaminated material.

19. The method of claim 1, wherein the chemical and/or biological amendments are organic materials.

20. The method of claim 1, which further includes the step of locating an impervious undercover below the treated contaminated material prior to the microenfractionating step thereby preventing the chemical and/or biological amendments from leaching into soil underlying the treated contaminated material.

21. The method of claim 1, wherein said treated hydrocarbon-containing contaminated material entraining air stream is conducted in an air stream containing chamber which comprises a front wall, an opposed side wall, and an air inlet opening formed in said front wall, or in one or more of said opposed side walls.

22. The method of claim 1, wherein said treated contaminated material entraining air stream is conducted in an air stream containing chamber which comprises a front wall and an air inlet opening formed in said front wall.

23. The method of claim 7, wherein said paddles extending radially outwardly from said drum are arranged in a plurality of V-shaped longitudinally-extending rows.

24. The method of claim 7, wherein first and second drum end portions are journaled in respective frame sides, said first and second end portions adapted for resisting a force acting to spread said opposing frame sides.

25. The method of claim 7, wherein said drum includes a first and second end portion each including a thrust bearing mounted outboard of a respective opposing frame side, and each thrust bearing adapted for rotatably bearing on an outboard surface of its respective opposing frame side to resist a force acting to spread the opposing frame sides.

26. The method of claim 7, wherein said paddle on a rotatable drum comprises:

a body having a first planar portion having a leading edge; and having a second planar portion connected at a first angle to the first paddle portion, the second planar portion oriented so as to engage contaminated material with a planar surface when the rotatable drum is rotated; and mounting means connected to the body for mounting the paddle onto said elongate drum.

27. The method of claim 26, wherein said paddles further comprise a third planar portion connected at a second angle to the first paddle portion, the third planar portion adapted for engaging contaminated material with a planar surface when the rotatable drum is rotated.

28. The method of claim 7, wherein said paddles comprise mounting means including a base portion having first hole for receiving a paddle attachment bolt and a having a second hole for receiving a shear pin.

29. In a method of accelerated bioremediation for treating hydrocarbon-containing contaminated material, wherein said hydrocarbon-containing contaminated material is treated with chemical and/or biological amendments, the improvement which comprises:
   a. providing said treated hydrocarbon-containing contaminated material;
   b. providing an entraining air stream having a sufficient velocity for entraining the treated hydrocarbon-containing contaminated material therein;
   c. entraining the treated hydrocarbon-containing contaminated material in the air stream;
   d. microenfractionating the treated hydrocarbon-containing contaminated material; and
   e. discharging the microenfractionated treated hydrocarbon-containing contaminated material from the air stream for acceleratedly bioremediating the treated hydrocarbon-containing contaminated material under conditions sufficient for conducting said accelerated bioremediation.

30. The method of claim 29, wherein the step of providing an entraining air stream comprises providing an entraining air stream including a plurality of upwardly and transversely flowing, intersecting air currents.

31. The method of claim 29, wherein the entraining air stream comprises a vortex-like entraining air stream.

32. The method of claim 29, wherein the step of providing an entraining air stream includes the step of rotating a drum assembly at a rotational speed sufficient for generating the entraining air stream, the drum assembly including means for generating a plurality of intersecting air currents when rotated.

33. The method of claim 29, wherein the accelerated bioremediation purges $CO_2$ from, and aerates the treated hydrocarbon-containing contaminated material.

34. The method of claim 29, wherein the volume of treated contaminated material which is acceleratedly bioremediately treated is at least about 1500 cubic yards per day per apparatus.

35. The method of claim 29, which further includes the step of adding wood particles to the treated contaminated material prior to the microenfractionating step.

36. The method of claim 29, wherein the microenfractionating step comprises homogenizing and aerating the treated contaminated material.

37. The method of claim 29, which includes the step of microenfactionating treated hydrocarbon-containing contaminated non-microenfractionated material thereby increasing the surface area of said treated hydrocarbon-containing contaminated non-microenfractionated material, as compared to the surface area of the treated hydrocarbon-containing contaminated non-microenfractionated material, by a factor of at least about $1 \times 10^6$.

38. The method of claim 29, wherein the average ambient temperature during the accelerated bioremediation of the treated contaminated material is not more than about 10 degrees C.

39. The method of claim 29, which further includes the step of redistributing the microenfractionated treated contaminated material from the air stream throughout a soil matrix thereby substantially increasing the surface area of the microenfractionated treated contaminated material.

40. The method of claim 37, which further includes the step of further dispersing the chemical and/or biological amendments throughout the redistributed microenfractionated treated contaminated material.

41. The method of claim 29, wherein the chemical and/or biological amendments are organic materials.

42. The method of claim 29, which further includes the step of, after microenfractionating the treated hydrocarbon-containing contaminated material to form a microenfractionated treated hydrocarbon-containing contaminated material, locating a cover over the microenfractionated treated hydrocarbon-containing contaminated material, the cover including means for allowing substantial solar radiation to pass therethrough and into the microenfractionated treated hydrocarbon-containing contaminated material and means for preventing moisture from passing therethrough, thereby facilitating the accelerated bioremediation while preventing moisture from soaking through the cover and passing into the micro-enfractionated treated hydrocarbon-containing contaminated material.

43. The method of claim 35, wherein the amount of wood particles added to the treated hydrocarbon-containing contaminated material prior to the microenfractionating step is up to about 20% by volume, based on the total volume of the treated hydrocarbon-containing contaminated material.

44. In a method of accelerated bioremediation for treating hydrocarbon-containing contaminated material, wherein said hydrocarbon-containing contaminated material is treated with chemical and/or biological amendments, the improvement with comprises:
   a. providing said treated hydrocarbon-containing contaminated material;
   b. providing an entraining air stream having a sufficient velocity for entraining the treated hydrocarbon-containing contaminated material therein;
   c. entraining the treated hydrocarbon-containing contaminated material in the air stream;
   d. microenfractionating the treated hydrocarbon-containing contaminated material employing a microenfractionating apparatus; and
   e. discharging the microenfractionated treated hydrocarbon-containing contaminated material from the air stream for acceleratedly bioremediating the treated hydrocarbon-containing contaminated material under conditions sufficient for conducting said accelerated bioremediation, at least about 70% of a total amount of hydrocarbon material in the treated hydrocarbon-containing contaminated material being remediated within 120 days of microenfractionating the treated hydrocarbon-containing contaminated material, the volume of treated hydrocarbon-containing contaminated material which is acceleratedly bioremediately treated is at least about 1500 cubic yards per day per microenfractionating apparatus.

* * * * *